(12) United States Patent
Koga

(10) Patent No.: US 8,560,555 B2
(45) Date of Patent: Oct. 15, 2013

(54) INFORMATION PROCESSING METHOD, INFORMATION PROCESSING PROGRAM AND INFORMATION PROCESSING DEVICE

(75) Inventor: Yuzuru Koga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 13/186,714

(22) Filed: Jul. 20, 2011

(65) Prior Publication Data

US 2011/0276544 A1 Nov. 10, 2011

Related U.S. Application Data

(63) Continuation of application No. 12/178,381, filed on Jul. 23, 2008, and a continuation of application No. PCT/JP2006/300995, filed on Jan. 24, 2006.

(51) Int. Cl.
*G06F 17/30* (2006.01)
(52) U.S. Cl.
CPC .... *G06F 17/30073* (2013.01); *G06F 17/30221* (2013.01)
USPC ............................ 707/749; 707/640; 711/171
(58) Field of Classification Search
CPC ................................................ G06F 17/30076
USPC ......... 707/640, 692, 705, 713, 749, 750, 752, 707/821; 711/171; 709/231
See application file for complete search history.

(56) References Cited

U.S. PATENT DOCUMENTS 5,963,951 A * 10/1999 Collins ......................... 707/705
6,144,969 A * 11/2000 Inokuchi et al. ............. 707/705
6,581,105 B2 * 6/2003 Miloslavsky et al. ........ 709/238
7,277,959 B2 * 10/2007 Miyamoto et al. ........... 709/231

2002/0093582 A1 7/2002 Aoki et al.
2003/0074352 A1 * 4/2003 Raboczi et al. ............... 707/713
2006/0168012 A1 * 7/2006 Rose et al. .................... 709/206

FOREIGN PATENT DOCUMENTS

| JP | 7-319897 | 12/1995 |
| JP | 2002-207621 | 7/2002 |
| JP | 2003-296162 | 10/2003 |
| JP | 2004-139301 | 5/2004 |

OTHER PUBLICATIONS

Koichi, Hirasawa, Japanese Patent No. 2003-296162, Publication date: Oct. 17, 2003, Whole Document Machine Translation. Total pp. 26. (Three part documents).*

(Continued)

*Primary Examiner* — Shahid Alam
(74) *Attorney, Agent, or Firm* — Fujitsu Patent Center

(57) ABSTRACT

Provided are an information processing method, an information processing program, and an information processing device for copying or moving a file. The method includes a step for comparing file information and judging whether the file information coincide. The comparison element of the file information contains a file content. That is, the method includes: a step for comparing the file names of the copy source and copy destination or the movement source and the movement destination and judging whether a file of the same name exists in the copy destination or the movement destination; a step for comparing the file contents if a file of the same name exists in the copy destination or the movement destination so as to judge whether the file contents are identical; and a step for outputting the comparison results of the file contents.

3 Claims, 31 Drawing Sheets

(56) References Cited

OTHER PUBLICATIONS

USPTO, (Alam) Notice of Allowance and Notice of Allowability dated Oct. 6, 2011, in parent U.S. Appl. No. 12/178,381 [now allowed].

International Preliminary Report on Patentability and Written Opinion of the International Searching Authority mailed Aug. 7, 2008 and issued in corresponding PCT/JP2006/300995, with English Translation.

International Search Report mailed Feb. 21, 2006 in connection with International Application No. PCT/JP2006/300995, with English-language Translation.

Japanese Office Action mailed by the JPO and corresponding to Patent Appl. No. 2007-555787 on May 17, 2011, with English Translation.

Japanese Office Action issued Feb. 8, 2011 in corresponding Japanese Patent Application 2007-555787, with Partial English-language Translation.

USPTO, [Koga] U.S. Appl. No. 12/178,381 (parent), [CTNF] Non-Final Office Action issued on Mar. 18, 2011.

USPTO, [Koga] U.S. Appl. No. 12/178,381 (parent), [CTRS] Requirement for Restriction/Election issued on Dec. 7, 2010.

USPTO, (Alam) Notice of Allowance and Notice of Allowability dated Feb. 2, 2012, in parent U.S. Appl. No. 12/178,381 [now allowed].

USPTO, (Alam) Notice of Allowance and Notice of Allowability dated Feb. 15, 2013, in parent U.S. Appl. No. 12/178,381 [now allowed].

Partial English-language Translation of JP-2004-139301-A (previously cited on Jul. 20, 2011).

Japanese Office Action mailed Jul. 30, 2013 for corresponding Japanese Application No. 2011-178451, with Partial English-language Translation.

* cited by examiner

COPY SOURCE (OR MOVEMENT SOURCE) FOLDER        COPY DESTINATION (OR MOVEMENT DESTINATION) FOLDER (CASE 1)

(CASE 2)

(CASE 3)

(CASE 4)

(CASE 5)

INFORMATION PROCESSING METHOD, INFORMATION PROCESSING PROGRAM AND INFORMATION PROCESSING DEVICE

CROSS-REFERENCE TO RELATED APPLICATIONS

This application is a continuation of U.S. application Ser. No. 12/178,381, filed on Jul. 23, 2008, which is a continuation of International Application No. PCT/JP2006/300995, filed on Jan. 24, 2006. The entire contents of these applications are herein incorporated by reference.

BACKGROUND OF THE INVENTION

1. Field of the Invention

The present invention relates to copying or moving a file in an information processing device such as a personal computer (PC). Specifically, the present invention relates to an information processing method, an information processing program and an information processing device for copying or moving a file.

2. Description of the Related Art

When a file is copied or moved in an information processing device such as a PC, in case there is a file of the same name in a copy or movement destination folder (or directory), a method is used that file information is displayed and it is inquired whether the file of a copy (or movement) source is made to overwrite on the file of the same name, etc. to make a user select whether to overwrite. Here, copying a file is a process of copying a file of a copy source into a copy destination folder. Copying a file results in existence of identical files of the same name in the copy source and copy destination. Moving a file is a process that after copying a file, the file of a copy source is erased and only a file of a copy destination is left. The moving process differs from the copying process in the point whether the file remains in the copy source. Overwriting a file is a process of overwriting a file of a copy source on a file existing in a copy destination.

Concerning such information processing, there are methods that: in a process of copying an image data file between different recording media, if there is a file of the same name in a recording medium of a copy destination and data contents thereof are identical, the copying process is stopped. If the data contents are different, the file is written after its file name is changed (Japanese Patent Application Laid-open Publication No. 2003-296162 (paragraph Nos. 0007, 0034 to 0037, FIG. 6, etc.)); to prevent a file from being erroneously overwritten, an entity part of a file to be transmitted from a digital camera to a server is copied and a new file is generated. The new file is given a different file name from a source file name. The new file name has a variation part where an increasing number according to transmission frequency is given. Therefore, the server recognizes the new file as individual one (Japanese Patent Application Laid-open Publication No. 2002-207621 (paragraph Nos. 0062, 0063, 0066, 0067, 0069, 0070, FIGS. 16, 23, etc.)).

In an information processing device such as a PC, the process of copying (or moving) a file is executed, e.g., by a program shown in FIG. 1 with using a dialog box 2 shown in FIG. 2. After the process of copying (or moving) a file is started, as shown in FIG. 1, a determination process whether a file of the same name exists in a copy destination is executed (step S1); if there is a file of the same name (YES at step S1), the dialog box 2 (FIG. 2) is displayed on a display connected to the information processing device (step S2).

In this case, since a file of the same name exists in the copy destination, it is displayed as file information on the dialog box 2 that "Confirm Overwriting File" on a title bar 4, an icon 6 representative of the process of copying or moving a file, icons 8 and 10 representative of files, "This folder already contains a file named 'patent.doc'.", "Would you like to overwrite the existing file
19.0 KB
updated: 21 Jul. 2004, 17:20:00
with this one?
19.0 KB
updated: 21 Jul. 2004, 15:30:00"

as file size and update dates and times thereof, for example, and icons 12, 14, 16 and 18 for inputting a response at a bottom line. It is displayed that on the icon 12, "Yes (Y)" representative of an affirmation input, on the icon 14, "Yes to All (A)" representative of an affirmation input, on the icon 16, "No (N)" representative of a negation input and on the icon 18, "Cancel" representative of an input for cancelling the process. The display enables a user to recognize the file information visibly, and to know there is the file of the same name in the copy destination folder. The user can also respond for selecting one of the desired icons 12 to 18 by moving a cursor 20 displayed on the dialog box 2 with being superimposed, and can execute a process corresponding to the response.

In this case, determination described below is done; determination of selection of "No (N)" (step S3); unless "No (N)" is selected (NO at step S3), determination of selection of "Yes (Y)" (step S4); unless "Yes (Y) is selected (NO at step S4), determination of selection of "Yes to All (A)" (step S5); unless "Yes to All (A)" is selected (NO at step S5), determination of selection of "Cancel" (step S6). If "Cancel" is selected (YES at step S6), the process ends.

In such process, unless there is a file of the same name in the copy destination folder (NO at step S1), copying is executed to another destination (copy or movement destination) folder (step S7). The copying is executed, for example, by creating an empty file in the copy destination folder where the file of the copy source is overwritten. In this case, incase of moving a file, the file of the copy source is erased (step S8), and the process ends.

In the dialog box 2, if "No (N)" is selected (YES at step S3), the process ends. If "Yes (Y)" is selected (YES at step S4) in the dialog box 2, overwriting is done on the file of the copy destination (step S9), and the process moves to step S8. If "Yes to All (A)" is selected (YES at step S5) in the dialog box 2, overwriting is done on the file of the copy destination (step S10), and the process moves to step S8. Unless "Cancel" is selected (NO at step S6), the process returns to step S3 and the process described above can be selected.

As stated above, file information can be referred to in confirmation and determination of overwriting a file with using the dialog box 2. That is effective in case the number of treated files is small and the amount of file distribution between PCs is small. However, there is a limit inevitably in case of file treatment, that is, exchange of files attached to electric mail that is sent and received frequently, treatment of many files downloaded from web sites, of many image files such as photos of a digital camera and of many files stored separately in a plurality of PCs that one user has. It is troublesome to respond one by one to an inquiry whether to overwrite when many files are integrated.

As for copying or moving a file, there is a technical art that files are distinguished by their dates and times, and newer one is left. For example, concerning files storing photos of a digital camera, since there is a case that although files of the same name exist, contents thereof are different, in integration, both of the files of the same name must be left. In such case, a process is insufficient for file management that an inquiry whether to overwrite or leaving only a file of the latest date and time without confirmation of file contents.

The background of existing files of the same name and contents is that people use PCs in their own way. For example, a user stores image files of a digital camera in a disc of a PC. When using the file with processing, since the user does not want to lose them because of miss-operation, etc., the same files are stored in a plurality of folders including network files, or copied files are stored in hard discs of a plurality of PCs. If one user uses many PCs, the case may occur that not only such backup, but also storing a plurality of files as well in order to offer the files for an edit or use without limit of time and location.

An edit called a retouch such as color adjustments, resizing and trimming is general for camera images. If a file is processed according to a situation where the file is used, information such as resolution of the original file is lost, and the original file is requested to be left with a processed file. To supplement failure during the edit, the existence of the original file is valuable. There is also meaning of leaving a processed file at each stage in case the file is processed in several stages. It is performed in general to store a processed file at each stage in another folder. In this case, files of the same name and different contents exist.

If a user uses a plurality of PCs according to the desired time and location, etc., it meets the user's request that the same files are stored in various places, moreover there is no distinction between the same files whether to be a master or backup, and a file in a folder can be processed in proper time. This may be the reason why files of the same name and different contents exist at the same time.

In a digital camera, a file of the same name is generated by a reset process. It cannot be ignored that if the reset process is performed as well in a plurality of digital cameras, many files of the same name are generated.

In sending and receiving a file attached to electronic mail and a file with using an HTTP (Hyper Text Transfer Protocol) server, etc., it is general that a file of the same name and contents but different update date and time is generated in a receiver side.

About a file edited in a folder, some users feel difficulty distinguishing the original file from a processed file as time has passed. If a totally different photo is stored in a file of the same name, or a file of different update date and time and the same contents is generated, distinction thereof is more difficult.

In case that files having existed for a long time or files in a state of confusion are arranged to be integrated, some users request to store a file of the same name but different contents as another file. Other users also request to unify files attached to electronic mail, etc. in integration even if each file has different update date and time.

There is no disclosure or suggestion about such requests and problems in Japanese Patent Application Laid-open Publication Nos. 2003-296162 and 2002-207621, and no structure to solve them is disclosed or suggested therein.

SUMMARY OF THE INVENTION

An object of the present invention relates to copying or moving a file, and is to improve convenience of file processing.

Described more particularly, the object thereof relates to copying or moving a file, and is to reduce user's operation to facilitate efficient file processing.

Another object of the present invention relates to copying or moving a file, and is to facilitate easiness or efficiency of file management.

To achieve the above object, a first aspect of the present invention there is provided an information processing method for copying or moving a file, comprising the step of: comparing file information and determining whether the file information coincides, wherein comparing elements of the file information include file contents. By such structure, the above objects can be achieved.

To achieve the above objects, a second aspect of the present invention there is provided an information processing method for copying or moving a file, comprising the steps of: comparing file names of a copy source and a copy destination, or a movement source and a movement destination, and determining whether a file of the same name exists in the copy destination or the movement destination; comparing file contents and determining whether the file contents are identical, when a file of the same name exists in the copy destination or the movement destination; and outputting a comparing result of the file contents.

As stated above, if, file contents are compared after file names are compared and a comparing result of the file contents is output, it is no need for a user to compare whether the file contents are identical or not with opening files. Thus, a process such as copying or moving a file can be executed easily and rapidly.

To achieve the above objects, preferably, the above information processing method may comprise the steps of: comparing file date and time, when the file contents are identical; inquiring whether the file date and time is modified when the file date and time is different; and modifying the date and time in response to the inquiry. Even if file contents are identical, the above inquiry enables a corresponding process if file date and time is different.

To achieve the above objects, preferably, the above information processing method may comprise the steps of: inquiring whether the file of the copy source or the movement source is overwritten on the file of the copy destination or the movement destination when the file contents are different; and overwriting the file in response to the inquiry. Such process prevents a file of a copy destination from being erroneously erased to improve storability of the file.

To achieve the above objects, preferably, the information processing method may comprise the steps of: inquiring whether the file name is modified when the file contents are different; and modifying the file name in response to the inquiry. Such process avoids giving a file of different contents the same name to improve accuracy of file management.

To achieve the above objects, a third aspect of the present invention there is provided an information processing method for copying or moving a file, comprising the steps of: comparing file names of a copy source and a copy destination, or a movement source and a movement destination, and determining whether a file of the same name exists in the copy destination or the movement destination; in case a file of the same name exists in the copy destination or movement destination, comparing file size and determining whether the file size is identical, when a file of the same name exists in the copy destination or the movement destination; and outputting a comparing result of the file.

According to such structure, compared with the comparing process of file contents, inconsistency of file contents can be confirmed by confirming inconsistency of file size, and thus more rapid processing is facilitated.

To achieve the above objects, preferably, the information processing method may comprise the step of: inquiring whether the comparison of a file is continued when the compared file size is huge. This can contribute to rapidness for file processing as well.

To achieve the above objects, a fourth aspect of the present invention there is provided an information processing program for causing a computer to execute copying or moving a file, comprising the step of: comparing file information and determining whether the file information coincides, wherein comparing elements of the file information include file contents.

To achieve the above objects, a fifth aspect of the present invention there is provided an information processing program for causing a computer to execute copying or moving a file, comprising the steps of: comparing file names of a copy source and a copy destination, or a movement source and a movement destination, and determining whether a file of the same name exists in the copy destination or the movement destination; comparing file contents and determining whether the file contents are identical, when a file of the same name exists in the copy destination or movement destination; and outputting a comparing result of the file contents.

By using such information processing program, the above described information processing method can be realized with a computer.

To achieve the above objects, preferably, the information processing program may comprise the steps of: in case the file contents are identical, comparing file date and time; inquiring whether the file date and time is modified when the file date and time is different; and modifying the date and time in response to the inquiry.

To achieve the above objects, preferably, the information processing program may comprise the steps of: inquiring whether the file of the copy source or the movement source is overwritten on the file of the copy destination or the movement destination when the file contents are different; and overwriting the file in response to the inquiry.

To achieve the above objects, preferably, the information processing program may comprise the steps of: inquiring whether the file name is modified when the file contents are different; and modifying the file name in response to the inquiry.

To achieve the above objects, a sixth aspect of the present invention there is provided an information processing program for causing a computer to execute copying or moving a file, comprising the steps of: comparing file names of a copy source and copy a destination, or a movement source and a movement destination, and determining whether a file of the same name exists in the copy destination or the movement destination; comparing file size and determining whether the file size is identical when a file of the same name exists in the copy destination or the movement destination; and outputting a comparing result of the file contents.

To achieve the above objects, preferably, the information processing program may comprise the step of: inquiring whether the comparison of a file is continued when the compared file size is huge.

To achieve the above objects, a seventh aspect of the present invention there is provided an information processing device for copying or moving a file, comprising: a processing unit that compares file information and determines whether the file information coincides, wherein comparing elements of the file information include file contents.

To achieve the above objects, an eighth aspect of the present invention there is provided an information processing device for copying or moving a file, comprising: a processing unit that compares file names of a copy source and a copy destination, or a movement source and a movement destination and determines whether a file of the same name exists in the copy destination or the movement destination, compares file contents when a file of the same name exists in the copy destination or the movement destination, determines whether the file contents are identical, and outputs a determination result thereof; and a display that displays the output of the processing unit.

According to such structure, after comparing file names, the processing unit compares file contents to output a comparing result thereof on the display. A user does not have to compare whether the file contents are identical or not with opening files. A process such as copying or moving a file can be easily and rapidly performed.

To achieve the above objects, according to the above information processing device, preferably the processing unit may compare file date and time when the file contents are identical; inquire whether the file date and time is modified when the file date and time is different; and modify the date and time in response to the inquiry.

To achieve the above objects, according to the above information processing device, preferably the processing unit may, in case the file contents are different, inquire whether the file of the copy source or the movement source is overwritten on the file of the copy destination or the movement destination; and overwrite the file in response to the inquiry.

To achieve the above objects, according to the above information processing device, preferably the processing unit may, in case the file contents are different, inquire whether the file name is modified; and modify the file name in response to the inquiry.

To achieve the above objects, a ninth aspect of the present invention there is provided an information processing device for copying or moving a file, comprising: a processing unit that compares file names of a copy source and a copy destination, or a movement source and a movement destination and determines whether a file of the same name exists in the copy destination or the movement destination, compares file size when a file of the same name exists in the copy destination or the movement destination, determines whether the file size is identical, and outputs a determination result thereof; and a display that displays the output of the processing unit.

To achieve the above objects, according to the above information processing device, preferably the processing unit may, in case the compared file size is huge, inquire whether the comparison of a file is continued.

The features and advantages of the present invention are listed as follows.

(1) Copying or moving a large variety of files such that contents thereof are identical but dates and times thereof are different can be made simplify, and convenience of file management can be improved.

(2) About copying or moving a file, user's operation can be reduced and file processing can be facilitated to be efficient.

(3) About copying or moving a file, efficiency of management of file contents can be facilitated.

Other objects, features and advantages of the present invention will be more clear by referring to the accompanying drawings and the embodiments.

DETAILED DESCRIPTION OF THE PREFERRED EMBODIMENTS

First Embodiment

Figure 1:
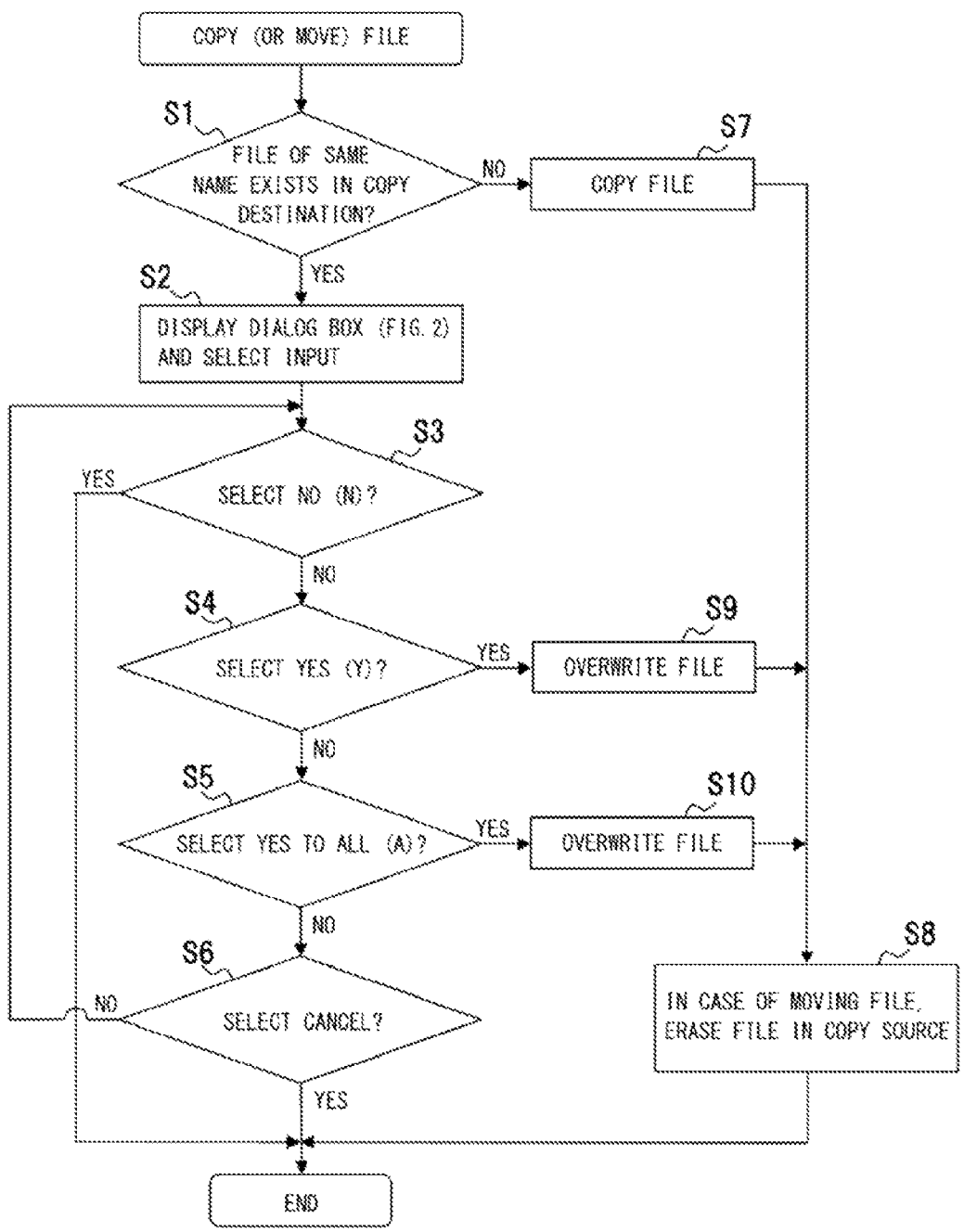
FIG. 1 depicts a conventional processing program.
Figure 2:
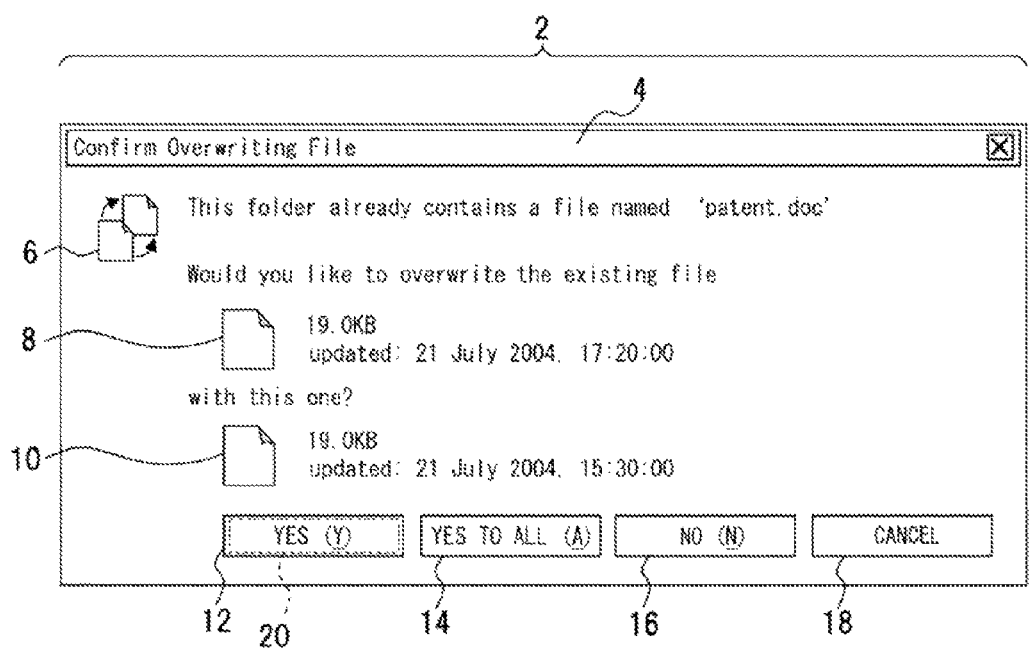
FIG. 2 depicts a conventional dialog box.
Figure 3:
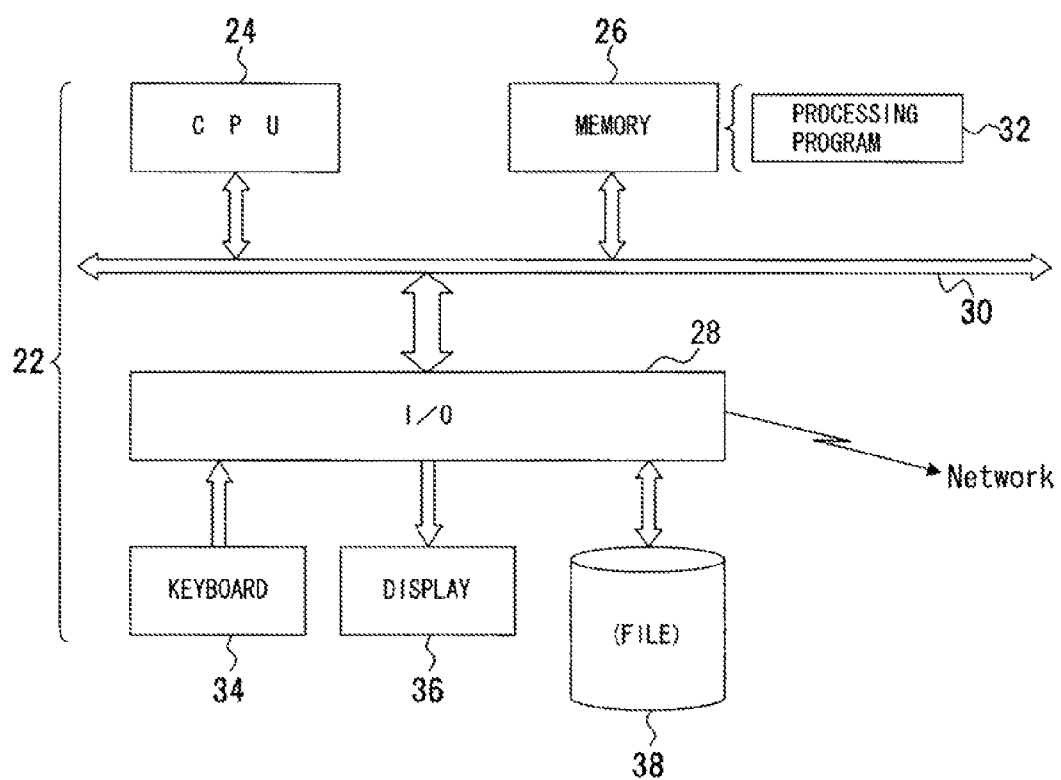
FIG. 3 depicts an example of a personal computer used for copying or moving a file according to a first embodiment.

A first embodiment of the present invention will be described with reference to FIG. 3. FIG. 3 depicts an example of a personal computer (PC) used for copying or moving a file.

This personal computer (PC) 22 is one example of an information processing device used in information processing for copying or moving a file. The PC 22 has a CPU (Central Processing Unit) 24 as a data processing unit, a memory 26 and an input output unit (I/O) 28, etc. The CPU 24, the memory 26 and the I/O 28 are interacted via a bus 30.

The CPU 24 executes a processing program 32, etc. stored in the memory 26 to compare file information. According to a comparing result thereof, the CPU 24 executes a process such as copying or moving a file. The memory 26 is configured by recording media such as a ROM (Read-Only Memory), a RAM (Random-Access Memory) and a hard disc to store the processing program 32 and other programs, etc. The processing program 32 is software for executing various information processes such as copying, moving or overwriting a file described below. For example, the processing program 32 is installed to be stored in a file stored in a hard disc. Data such as a file in the middle of processing is stored in the RAM temporally.

Here, copying a file is a process of copying a file of a copy source into a copy destination folder. Moving a file is a process that after copying a file, a file of a copy source is erased and only a file of a copy destination is left. Overwriting a file is a process of overwriting a file of a copy source on a file existing in a copy destination. That is, in copying a file, processes described below are executed:

a create an empty file in a copy destination;

b write file contents of a copy source into the empty file of the copy destination; and c set file update date and time of the copy destination as that of the copy source.

In overwriting a file, processes described below are executed:

a erase a file in a copy destination;

b create an empty file in the copy destination;

c write file contents of a copy source into the empty file of the copy destination; and d set file update date and time of the copy destination as that of the copy source.

or, e modify a file of a copy destination to be empty;

f write file contents of a copy source into the empty file of the copy destination; and g set file update date and time of the copy destination as that of the copy source.

The I/O 28 has functions as an input device for inputting data and programs to the CPU 24 and the memory 26, and as an output device for outputting an execution result, etc. To the I/O 28, a keyboard 34 used for cursor operation and data input, etc. is connected. Also, a display 36 as an output unit or a display for outputting file information and inquiry messages is connected to the I/O 28. A storage 38, for example as a recording medium, is connected to the I/O 28. One or a plurality of files are stored in the storage 38. The plurality of files are managed with being classified into folders or directories. The storage 38 may be disposed outside the PC 22. The storage 38 is not limited to a form of a device and storing. The I/O 28 has a function of sending and receiving data with being connected to a network.

By executing the processing program 32 with using such PC 22, following processes can be performed.

(1) File information is compared. As this comparing process, in case one or a plurality of files existing in a specific folder (or directory) are copied (or moved) to another folder (or directory), if there is a file of the same name in the copy destination folder, file contents are compared.

(2) As a comparing element of file information, if the file contents are identical, file dates and times are compared. If the dates and times are different, it is inquired whether the file date and time of the copy destination folder is set at older date and time or newer date and time.

(3) If the file contents are different, whether the file is overwritten or not is inquired.

(4) Whether a file name is modified automatically or not is inquired.

(5) In case modification of the file name is selected, after modification of the file name, the file is copied.

(6) In case whether the file contents are identical or not is compared, it is assumed that it takes enormous time for the comparison if file size is huge. If the files are predetermined size or over, whether the comparison is continued or not is inquired. In this case, it may be performed that not whether the files are predetermined size or over is inquired, but after parts of the files (for example, front parts of the files) are compared, whether the comparison is continued or not is inquired if the parts thereof are identical.

In these processes, the above described processes of inquiry are executed by display of dialog boxes (D1 to D9) on the display 36. Also as to moving a file, the processes (1) to (6) may be performed. If a file of a copy source is erased, file moving has done.

By such file processes, efficient file copy or movement can be done and efficient file management also can be done.

Figure 4:
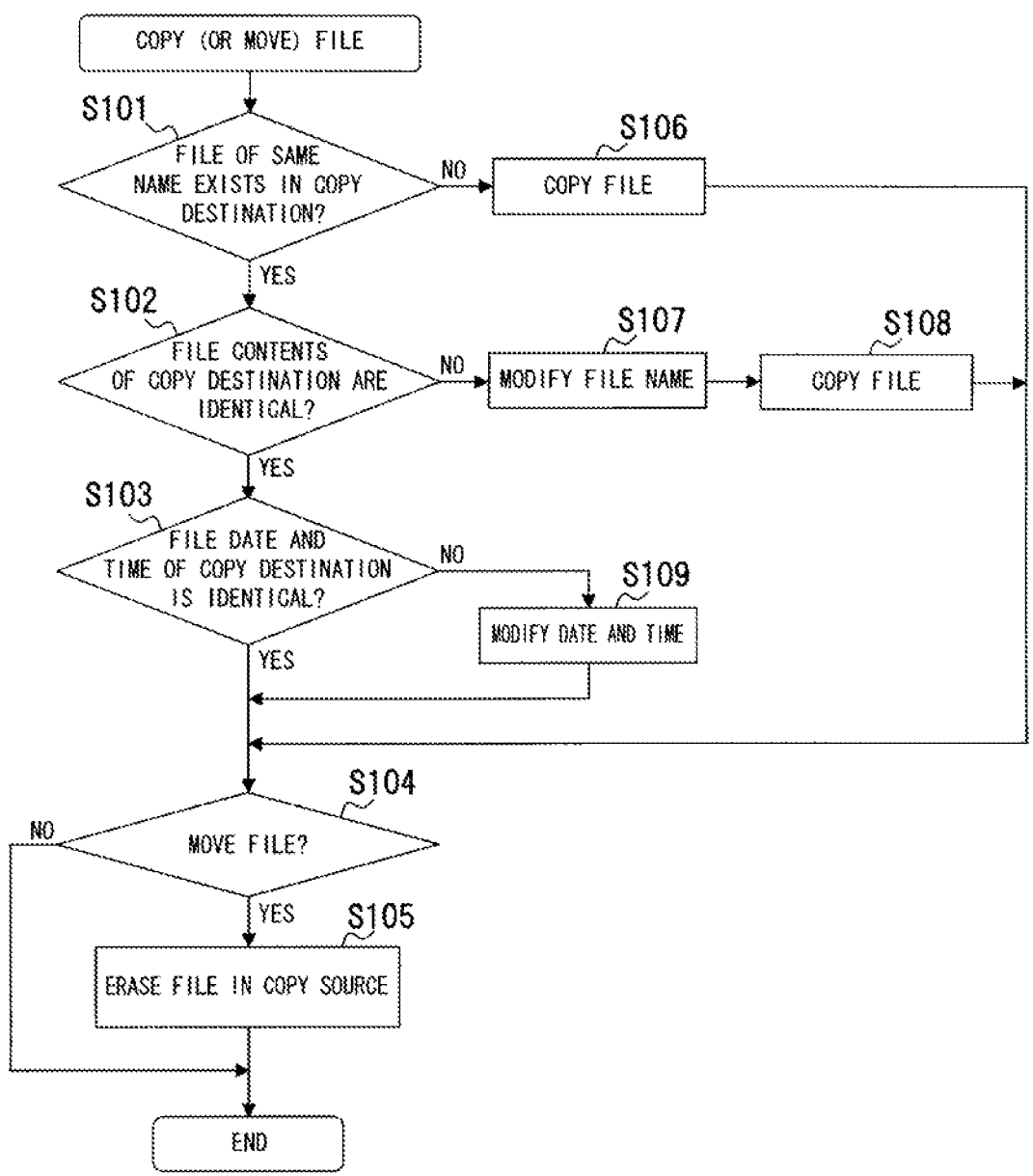
FIG. 4 is a flowchart showing an example of a processing program for copying (or moving) a file.

Processes for copying (or moving) a file will be described with reference to FIG. 4. FIG. 4 is a flowchart showing an example of a processing program for copying (or moving) a file.

The above listed processes are executed as follows.

If the process for copying (or moving) a file is started, file names are compared and whether a file of the same name exists or not in a copy destination is determined (step S101). If a file of the same name exists (YES at step S101), file contents are compared and whether file contents of the copy destination are identical or not with that of a copy source is determined (step S102). If the file contents of the copy destination are identical (YES at step S102), file dates and times are compared. Whether file date and time of the copy destination is identical with that of the copy source is determined (step S103). If the file dates and times are identical (YES at step S103), the files of the copy destination and copy source are completely identical.

In this case, whether the process is moving a file or not is determined (step S104). If it is moving a file (YES at step S104), the file of the copy source is erased (step S105) and the process is ended. If it is not moving a file (NO at step S104), the process is ended.

In this process, unless a file of the same name exists in the copy destination (NO at step S101), the file is copied to another destination folder (step S106). As described above, copying is executed, for example, by creating an empty file in the copy destination folder where a file of a copy source is overwritten. In this case, whether the process is moving a file or not is determined (step S104). In case not moving a file (NO at step S104), the process is ended. In case of moving a file (YES at step S104), the file of the copy source is erased (step S105) and the process is ended.

In case a file of the same name exists in the copy destination and the file contents thereof are different (NO at step S102), a modifying process of a file name (FIG. 5) is executed (step S107), the file is copied (step S108) and the process moves to step S104. If the file date and time of the copy destination is different (NO at step S103), a modifying process of date and time (FIG. 7) is executed (step S109), and the process moves to step S104.

Figure 5:
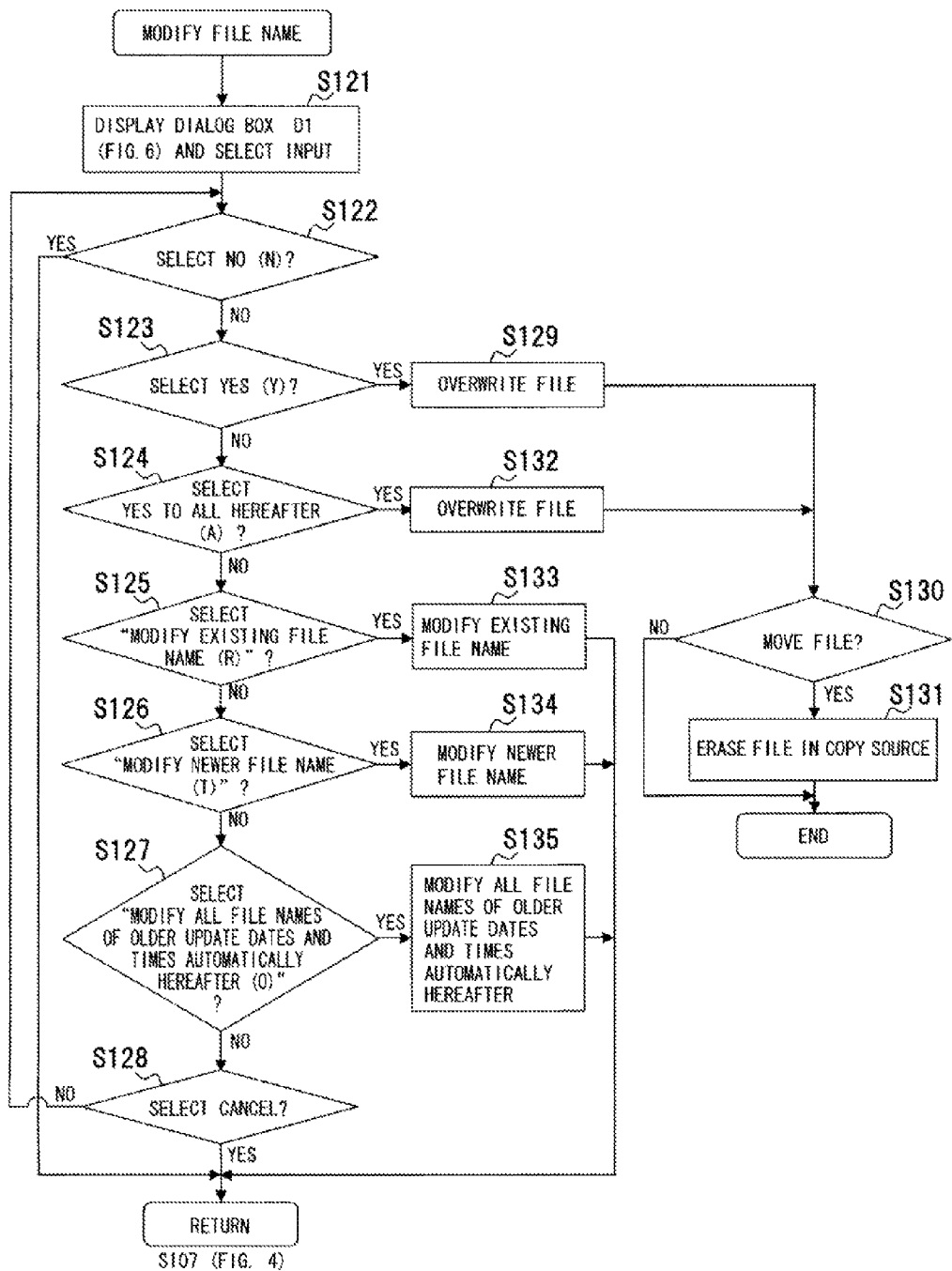
FIG. 5 is a flowchart showing a modifying process of a file name.
Figure 6:
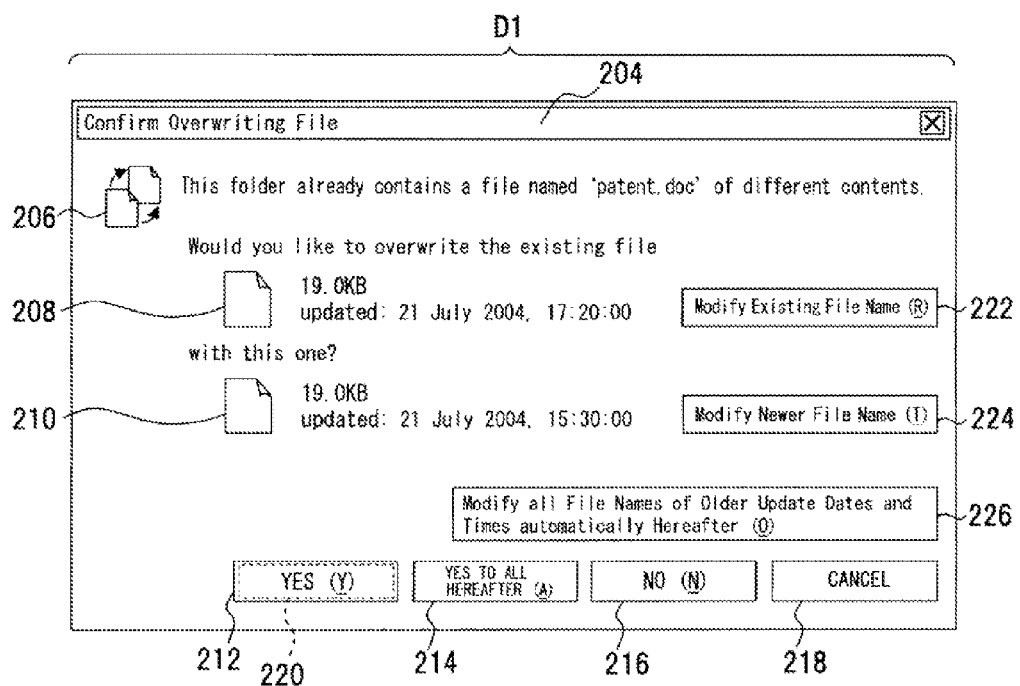
FIG. 6 depicts an example of a dialog box representative of confirmation of overwriting accompanying with modifying of a file name.

Modification of a file name (S107 in FIG. 4) will be described with reference to FIGS. 5 and 6. FIG. 5 is a flowchart showing a modifying process of a file name and FIG. 6 depicts an example of a dialog box representative of confirmation of overwriting by accompanying with modifying of a file name.

This process intends that since file names of a copy source and copy destination are identical but contents thereof are different, one of the file names is modified and both files of different contents are stored. Then, in the modifying process of a file name, a dialog box D1 shown in FIG. 6 is displayed and input selection is promoted to a user (step S121). This dialog box D1 displays file information and inquiry messages, etc. in case a file of the same name but different contents exists in the copy destination folder. That is, in the dialog box D1, it is displayed as file information on a title bar 204 that "Confirm Overwriting File", an icon 206 representative of the process of copying or moving a file, icons 208 and 210 representative of the files, "This folder already contains a file named 'patent.doc' of different contents.", "Would you like to overwrite the existing file 19.0 KB update: 21 Jul. 2004, 17:20:00 with this one?

19.0 KB update: 21 Jul. 2004, 15:30:00"

as file size and update dates and times thereof, for example, and icons 212, 214, 216, 218, 222, 224 and 226 for inputting a response. It is displayed that on the icon 212, "Yes (Y)" representative of an affirmation input, on the icon 214, "Yes to All Hereafter (A)" representative of an affirmation input, on the icon 216, "No (N)" representative of a negation input, on the icon 222, "Modify Existing File Name (R)" representative of modifying contents, on the icon 224, "Modify Newer File Name (T)" representative of modifying contents, on the icon 226, "Modify All File Names of Older Update Dates and Times Automatically Hereafter (O)" representative of automatic modification as modifying contents, and on the icon 218, "Cancel" representative of an input for cancelling the process.

In the dialog box D1, determination described below is done: determination of selection of "No (N)" (step S122); unless "No (N)" is selected (NO at step S122), determination of selection of "Yes (Y)" (step S123); unless "Yes (Y)" is selected (NO at step S123), determination of selection of "Yes to All (A)" (step S124); unless "Yes to All (A)" is selected (NO at step S124), determination of selection of "Modify Existing File Name (R)" (step S125); unless "Modify Existing File Name (R)" is selected (NO at step S125), determination of selection of "Modify Newer File Name (T)" (step S126); unless "Modify Newer File Name (T)" is selected, (NO at step S126), determination of selection of "Modify All File Names of Older Update Dates and Times Automatically Hereafter (O)" (step S127); unless "Modify All File Names of Older Update Dates and Times Automatically Hereafter (O)" is selected (NO at step S127), determination of selection of "Cancel" (step S128). If "Cancel" is selected (YES at step S128), the process returns to step S107 (FIG. 4).

In the dialog box D1, if "No (N)" is selected (YES at step S122), the process returns to step S107 (FIG. 4). If "Yes (Y)" is selected (YES at step S123) in the dialog box D1, overwriting of the next newer file is done on the existing file (step S129). Whether moving a file or not is determined (step S130). If it is moving a file (YES at step S130), the file of the copy source is erased (step S131) and the process is ended. Unless it is moving a file (No at step S130), after overwriting, the process is ended.

If "Yes to All Hereafter (A)" is selected (YES at step S124), the newer file is overwritten on the existing file (step S132) and the process moves to step S130.

In the dialog box D1, if "Modify Existing File Name (R)" is selected (YES at step S125), the exiting file name is modified (step S133). If "Modify Newer File Name (T)" is selected (YES at step S126), the newer file name is modified (step S134). If "Modify All File Names of Older Update Dates and Times Automatically Hereafter (O)" is selected (YES at step S127), all file names of older Update dates and times are modified automatically hereafter (step S135) and the process returns to step S107 (FIG. 4).

Here, automatic modification of a file name means, for example, if a file name of older update date and time is "patent.doc", the name thereof is modified to, e.g., "patent-040721.doc". In this case, if "patent-040721.doc" has existed, the name may be modified like "patent-040721-1.doc". Such modification of a file name is option.

Figure 7:
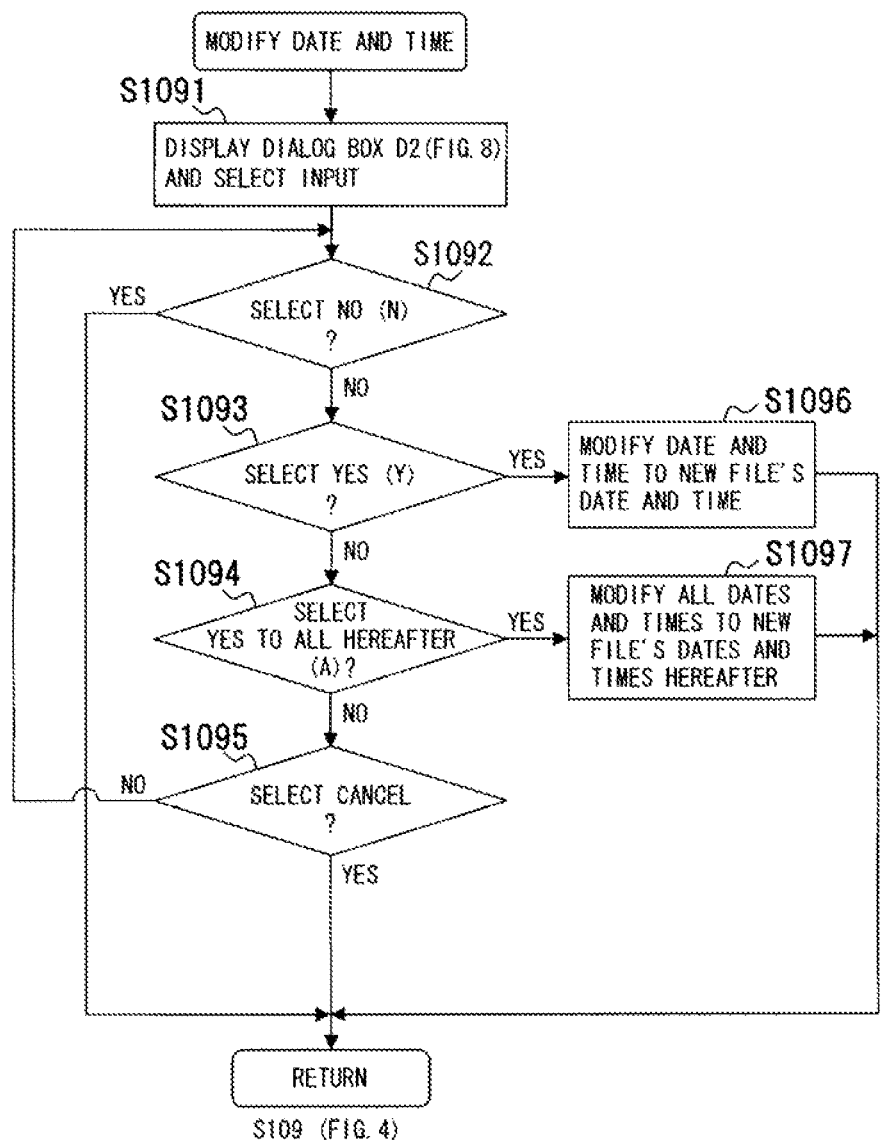
FIG. 7 is a flowchart showing a file date and time modification process.
Figure 8:
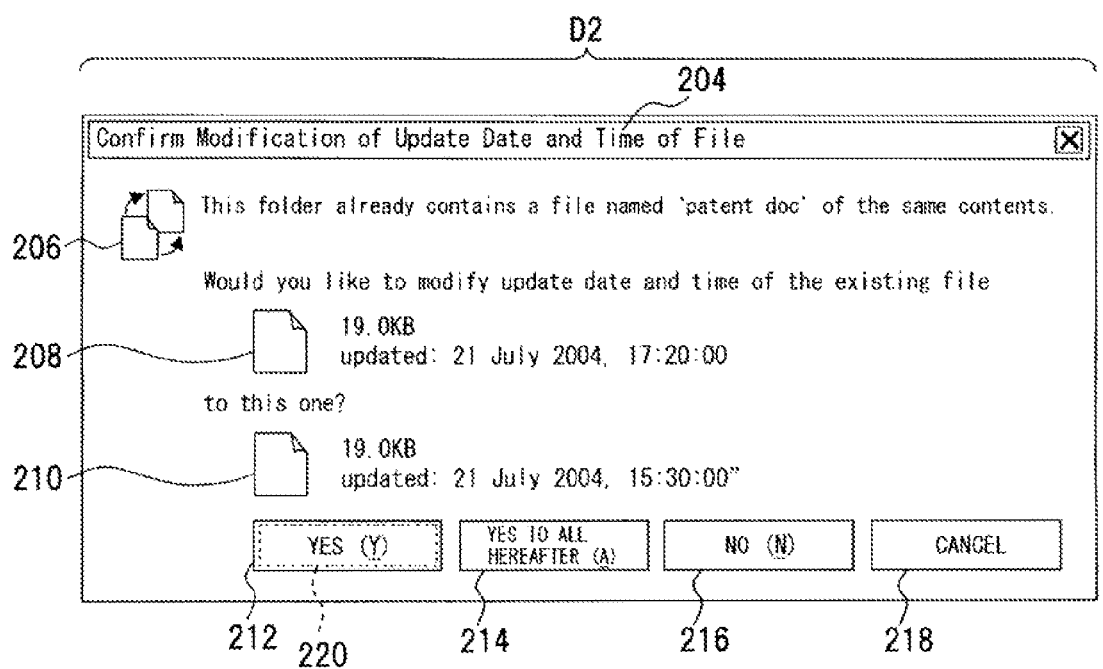
FIG. 8 is an example of a dialog box representative of confirmation of file date and time modification.

Modification of file date and time (S109 in FIG. 4) will be described with reference to FIGS. 7 and 8. FIG. 7 is a flowchart showing a file date and time modification process and FIG. 8 is an example of a dialog box to confirm modification of update date and time of a file.

In a modification process of file date and time, a dialog box D2 (FIG. 8) is displayed (step S1091). This dialog box D2 displays file information and inquiry messages, etc. in case a file of the same name and contents exists in the copy destination folder. That is, in the dialog box D2, as shown in FIG. 8, it is displayed as file information on the title bar 204 that "Confirm Modification of Update Date and Time of File", the icon 206 representative of the process of copying or moving a file, the icons 208 and 210 representative of files, "This folder already contains a file named 'patent.doc' of the same contents.", "Would you like to modify update date and time of the existing file
19.0 KB
updated: 21 Jul. 2004, 17:20:00
with this one?
19.0 KB
updated: 21 Jul. 2004, 15:30:00"
as file sizes and update dates and times thereof, for example, and icons 212, 214, 216 and 218 for inputting a response. It is displayed that on the icon 212, "Yes (Y)" representative of an affirmation input, on the icon 214, "Yes to All Hereafter (A)" representative of an affirmation input, on the icon 216, "No (N)" representative of a negation input, and on the icon 218, "Cancel" representative of an input for cancelling the process.

In the dialog box D2, determination described below is done: determination of selection of "No (N)" (step S1092); unless "No (N)" is selected (NO at step S1092), determination of selection of "Yes (Y)" (step S1093); unless "Yes (Y)" is selected (NO at step S1093), determination of selection of "Yes to All Hereafter (A)" (step S1094); unless "Yes to All Hereafter (A)" is selected (NO at step S1094), determination of selection of "Cancel" (step S1095). If "Cancel" is selected (YES at step S1095), the process returns to step S109 (FIG. 4).

In the dialog box D2, if "No (N)" is selected (YES at step S1092), the process returns to step S109 (FIG. 4). If "Yes (Y)" is selected (YES at step S1093) in the dialog box D2, the existing file date and time is modified to the next new file update date and time (step S1096), and the process returns to step S109 (FIG. 4). If "Yes to All Hereafter (A)" is selected (YES at step S1094) in the dialog box D2, all the existing file dates and times are modified to the next new file update dates and times hereafter (step S1097), and the process returns to step S109 (FIG. 4).

Figure 9:
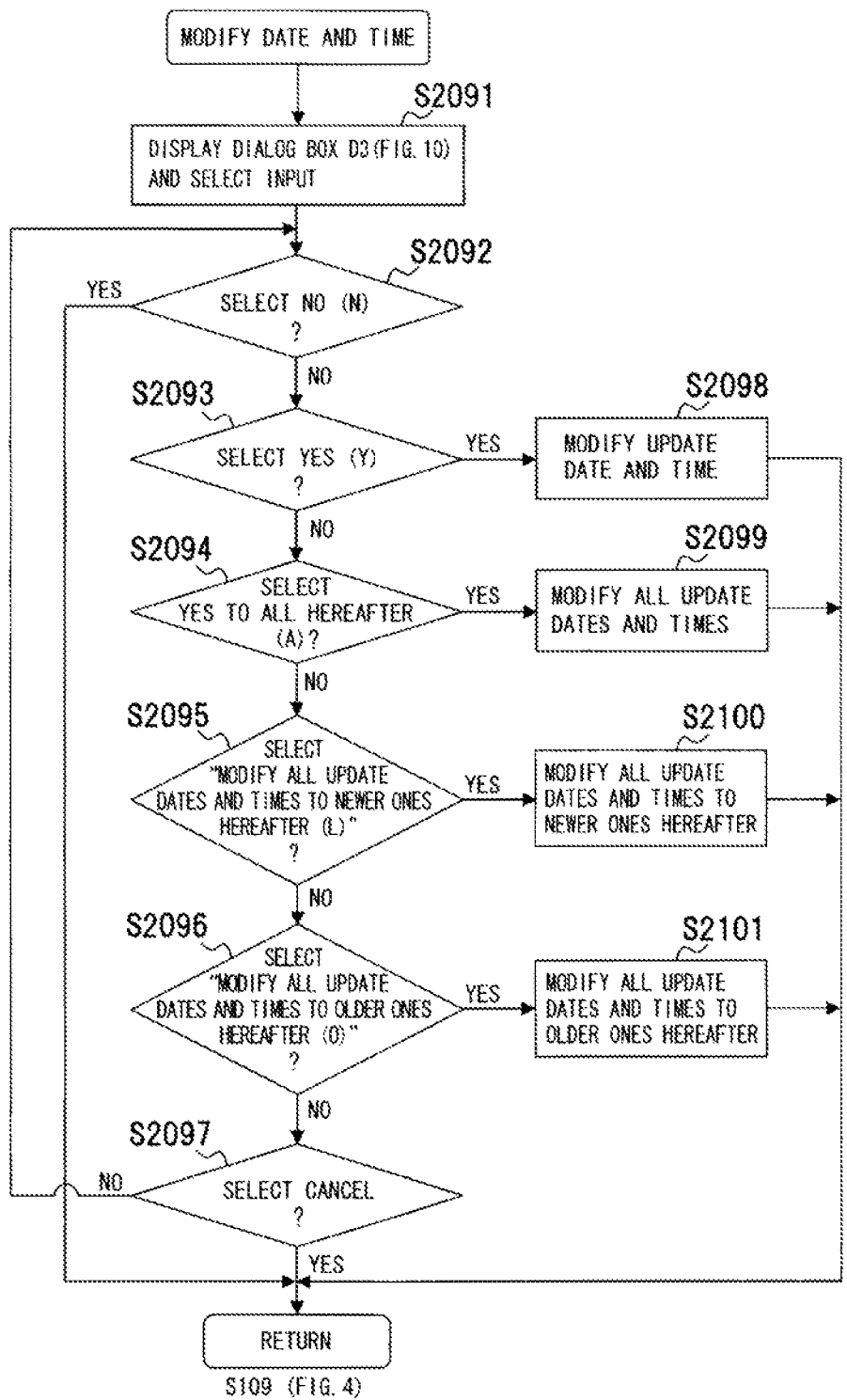
FIG. 9 is a flowchart showing another file date and time modification process.

Another modification of file date and time (S109 in FIG. 4) will be described with reference to FIGS. 9 and 10. FIG. 9 is a flowchart showing another modification process of file date and time and FIG. 10 depicts another dialog box for confirming modification of file update date and time.

Figure 10:
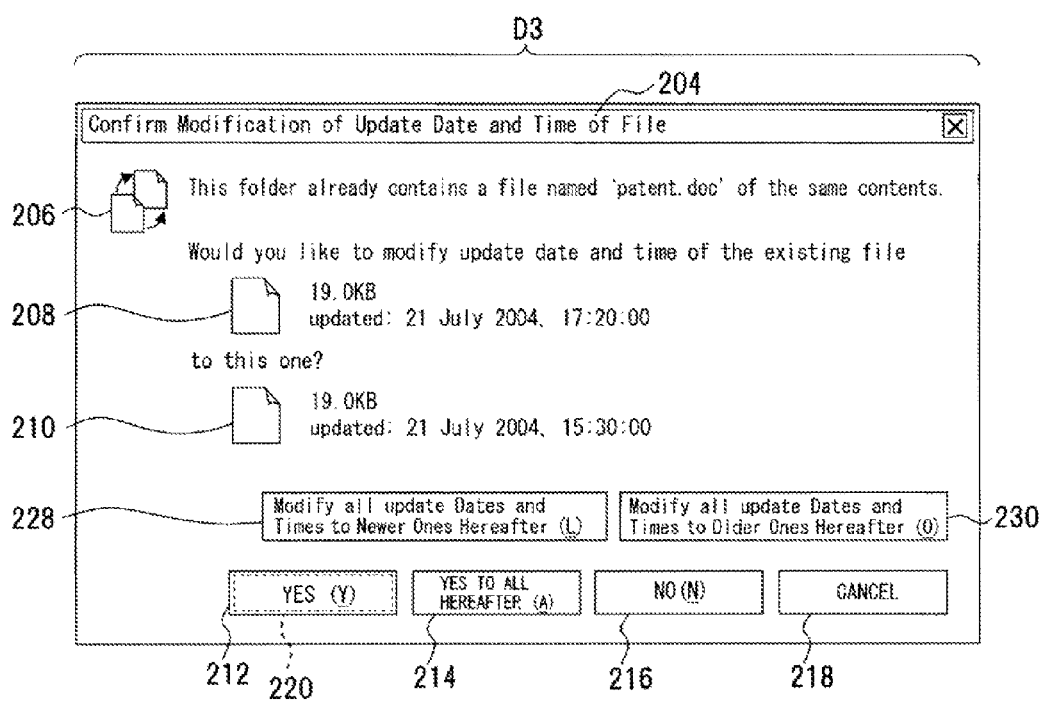
FIG. 10 depicts another dialog box for confirming file date and time modification.

In a modification process of file date and time, a dialog box D3 shown in FIG. 10 is displayed (step S2091). This dialog box D3 displays file information and inquiry messages, etc. in case a file of the same name and contents exists in the copy destination folder. That is, in the dialog box D3, it is displayed as file information on the title bar 204 that "Confirm Modification of Update Date and Time of File", the icon 206 representative of the process of copying or moving a file, the icons 208 and 210 representative of files, "This folder already contains a file named 'patent.doc' of the same contents.", "Would you like to modify update date and time of the existing file
19.0 KB
updated: 21 Jul. 2004, 17:20:00
with this one?
19.0 KB
updated: 21 Jul. 2004, 15:30:00"
as file sizes and update dates and times thereof, for example, and icons 212, 214, 216, 218, 228 and 230 for inputting a response. It is displayed that on the icon 212, "Yes (Y)" representative of an affirmation input, on the icon 214, "Yes to All Hereafter (A)" representative of an affirmation input, on the icon 216, "No (N)" representative of a negation input, on the icon 218, "Cancel" representative of an input for cancelling the process, on the icon 228, "Modify All Update Dates and Times to Newer Ones Hereafter (L)", and on the icon 230, "Modify All Update Dates and Times to Older Ones Hereafter (O)".

In the dialog box D3, determination described below is done: determination of selection of "No (N)" (step S2092); unless "No (N)" is selected (NO at step S2092), determination of selection of "Yes (Y)" (step S2093); unless "Yes (Y) is selected (NO at step S2093), determination of selection of "Yes to All Hereafter (A)" (step S2094); unless "Yes to All Hereafter (A)" is selected (NO at step S2094), determination of selection of "Modify All Update Dates and Times to Newer Ones Hereafter (L)" (step S2095); unless "Modify All Update Dates and Times to Newer Ones Hereafter (L)" is selected (NO at step S2095), determination of selection of "Modify All Update Dates and Times to Older Ones Hereafter (O)" (step S2096); unless "Modify All Update Dates and Times to Older Ones Hereafter (O)" is selected (NO at step S2096), determination of selection of "Cancel" (step S2097). If "Cancel" is selected (YES at step S2097), the process returns to step S109 (FIG. 4).

In the dialog box D3, if "No (N)" is selected (YES at step S2092), the process returns to step S109 (FIG. 4). If "Yes (Y)" is selected (YES at step S2093) in the dialog box D3, update date and time is modified (step S2098), and the process returns to step S109 (FIG. 4). If "Yes to All Hereafter (A)" is selected (YES at step S2094) in the dialog box D3, all update dates and times are modified (step S2099), and the process returns to step S109 (FIG. 4).

In the dialog box D3, if "Modify All Update Dates and Times to Newer Ones Hereafter (L)" is selected (YES at step S2095), all update dates and times are modified to newer ones hereafter (step S2100). If "Modify All Update Dates and Times to Older Ones Hereafter (O)" is selected (YES at step S2096), all update dates and times are modified to older ones hereafter (step S2101).

As is clear from such process, in case a file of the same name whose contents and update time and date coincide exists in the copy destination folder, a copying process is not necessary. In case of moving a file, a file of a movement source is erased.

Figure 11:
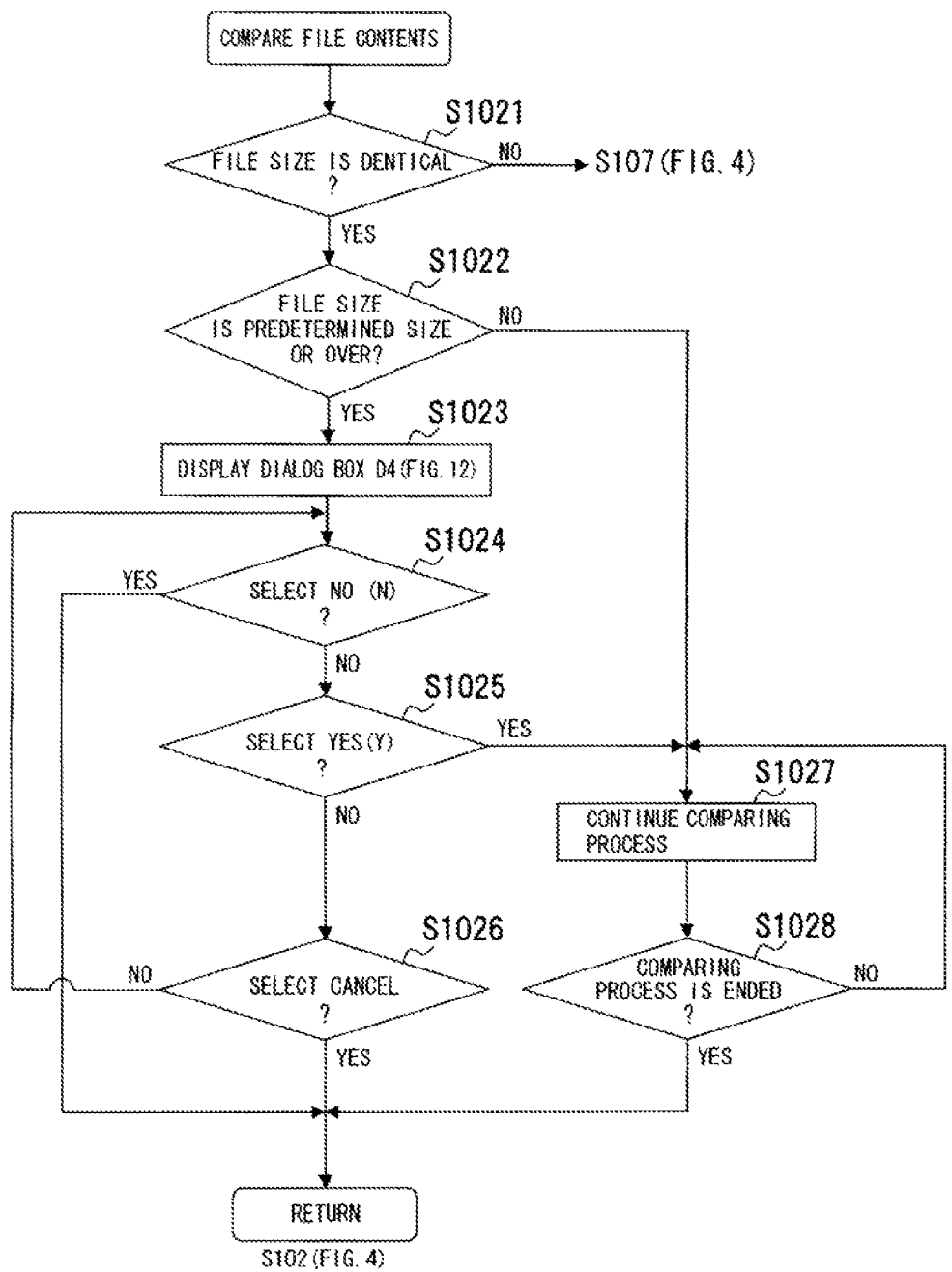
FIG. 11 is a flowchart showing a process of a comparing process of file contents with reference to file size.
Figure 12:
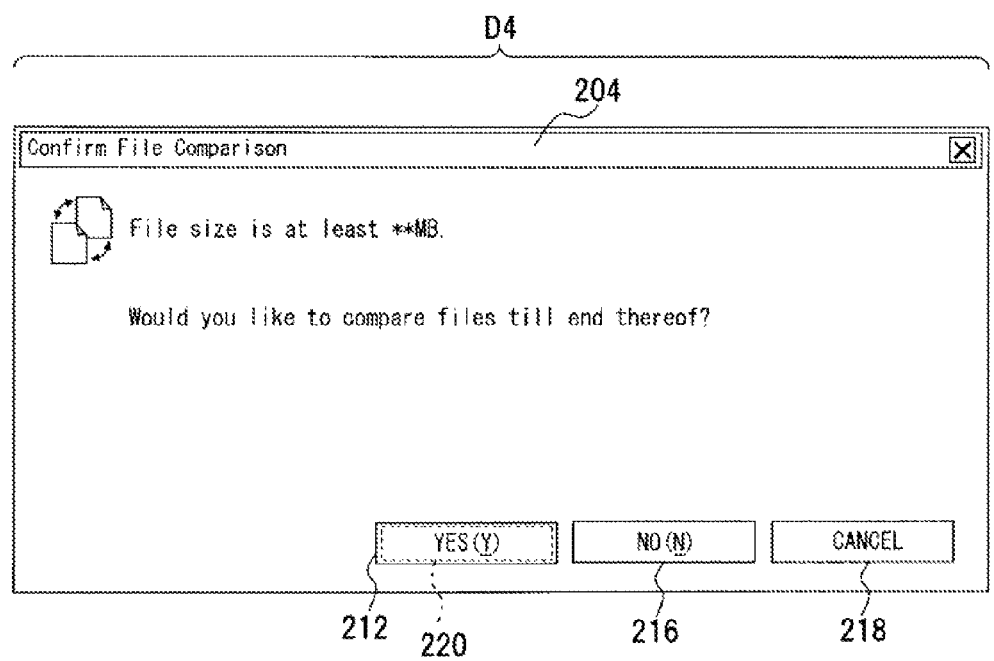
FIG. 12 is an example of a dialog box representative of a process concerning file size.

Comparison of file contents will be described with reference to FIGS. 11 and 12. FIG. 11 is a flowchart showing a process of a comparing process of file contents with reference to file size and FIG. 12 is an example of a dialog box representative of a process concerning file size.

As described above, comparison of file size can be partly substituted of comparison of file contents. In the comparison of file contents (step S102 in FIG. 4), in a process of referring to file size, whether file size is identical or not is determined (step S1021). If the file size is identical (YES at step S1021), whether the file size is a predetermined size or over, or not is determined (step S1022). If the file size is the predetermined size or over (YES at step S1022), the dialog box D4 shown in FIG. 12 is displayed (step S1023).

In the dialog box D4, as file information and inquiry to continue the comparing process, it is displayed that "File size is at least **MB. Would you like to compare files till end thereof?", the icon 212 representative of an affirmation input "Yes (Y)", the icon 216 representative of a negation input "No (N)", and the icon 218 representative of an input for cancelling the process "Cancel".

In the dialog box D4, determination described below is done: determination of selection of "No (N)" (step S1024); unless "No (N)" is selected (NO at step S1024), determination of selection of "Yes (Y)" (step S1025); unless "Yes (Y) is selected (NO at step S1025), determination of selection of "Cancel" (step S1026). If "Cancel" is selected (YES at step S1026), the process returns to step S102 in FIG. 4.

Unless the file size is the predetermined size or over (NO at step S1022), the comparing process is continued (step S1027) and whether the comparing process is ended or not is determined (step S1028). After the comparing process is ended, the process returns to step S102 in FIG. 4 to move to step S103. In the dialog box D4, if "No (N)" is selected (YES at step S1024), the process returns to step S102 in FIG. 4. If "YES (Y)" is selected (YES at step S1025), the process moves to step S1027 and the comparing process is continued. By the end of the comparing process, the process moves to step S103 in FIG. 4.

Second Embodiment

A second embodiment of the present invention will be described with reference to FIGS. 13, 14, 15 and 16. FIGS. 13, 14, 15 and 16 are flowcharts showing a processing program for copying a plurality of files. In FIG. 13, 14, 15 or 16, marks A, B, C, D, E and F are connectors representative of connection between flowcharts.

In the second embodiment, the above described PC 22 (FIG. 3) is used. Brief description thereof is as above.

Figure 13:
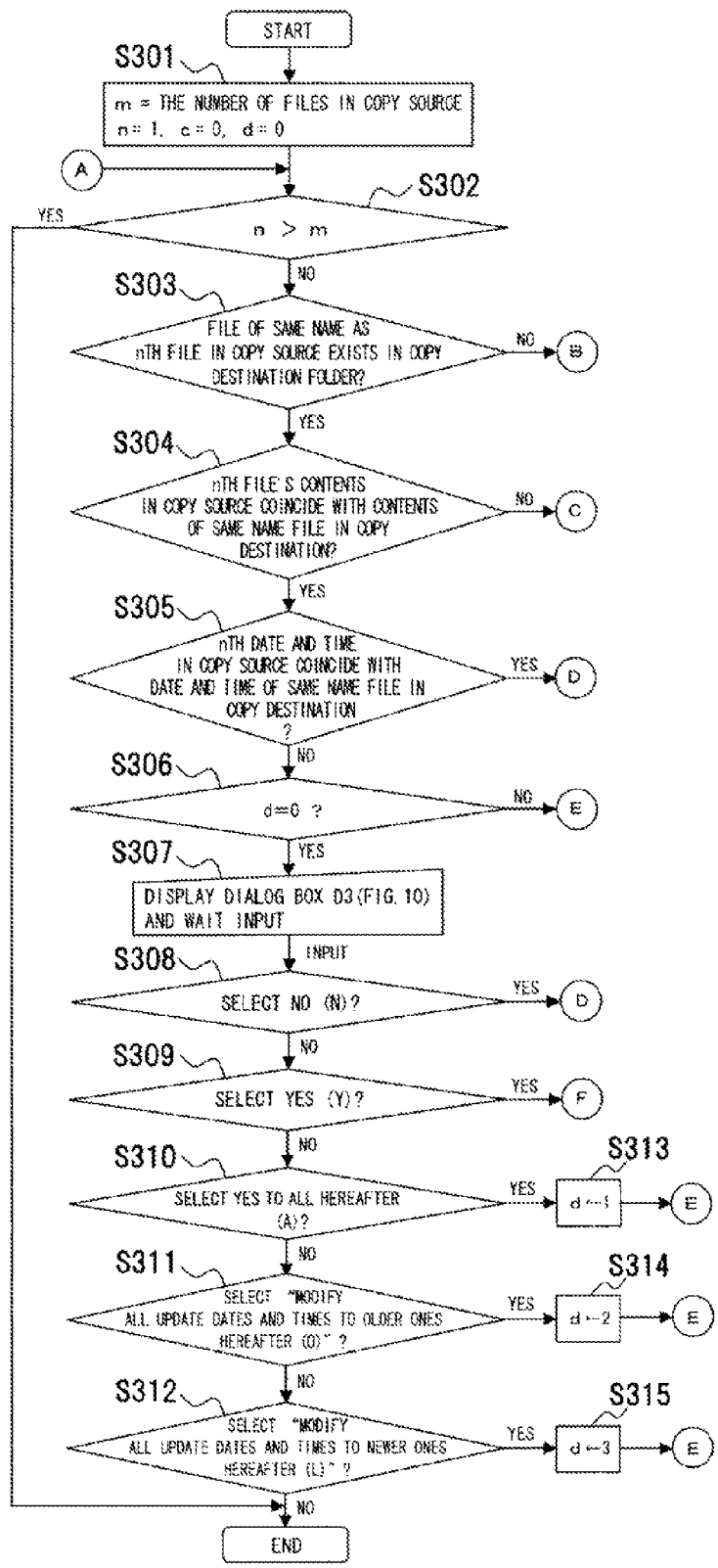
FIG. 13 is a flowchart showing a processing program for copying a file according to a second embodiment.

In a flowchart in FIG. 13 showing a copying process of a file, in this case, conditions are set that m=the number of files in a copy source, n=1, c=0 and d=0 (step S301). Here, m, which is the number of files in the copy source, means the number of processed files. n is a variable representative of what number of files is being processed at present against m. In this case, because of n=1, the process is started from n=an initial value, 1. Every after the process is ended, 1 is applied to n because of n=n+1 and the process is ended by n>m.

c is, for example, a variable representative whether "Yes to All Hereafter (A)" has been selected or not by an icon 214 in a dialog box D3 (FIG. 10). An initial value equals 0 (has not been selected).

d is a variable representative of a selective operation. In this case, an initial value is set in 0. For example, in the dialog box D3, it is set that selection of "Yes to All Hereafter (A)" (the icon 214) is d=1, selection of "Modify All Update Dates and Times to Older Ones Hereafter (O)" (an icon 230) is d=2 and selection of "Modify All Update Dates and Times to Newer Ones Hereafter (L)" (an icon 228) is d=3. Thus, d represents selection of corresponding icons 214, 230 and 228.

In this case, as initial values, n=1, c=0 and d=0 are set (step S301). m and n are compared (step S302) and if n>m (YES at step S302), since the number of processes n is over the number of files m and all the processes have been ended, the process is ended. Unless n>m (NO at step S302), the process moves to a comparing process of files of the same name.

If n<m (NO at step S302), file names are compared and whether a file of the same name as an nth file in the copy source exists in a copy destination folder or not is determined (step S303).

If a file of the same name exists in the copy destination folder (YES at step S303), file contents are compared and whether nth file's contents in the copy source coincide with contents of the same name file in the copy destination or not is determined (step S304).

If the nth file's contents in the copy source coincide with the contents of the same name file in the copy destination (YES at step S304), file dates and times are compared. Whether nth file's date and time in the copy source coincide with date and time of the same name file in the copy destination or not is determined (step S305).

If the nth file's date and time in the copy source is different from the date and time of the same name file in the copy destination (NO at step S305), whether d=0 or not is determined (step S306). If d=0 (YES at step S306), the dialog box D3 (FIG. 10) is displayed on a display 36 and an input from a user is waited (step S307).

About an input to the dialog box D3, it is determined that whether "No (N)" (an icon 216) is selected (step S308), whether "Yes (Y)" (an icon 212) is selected (step S309), whether "Yes to All Hereafter (A)" (the icon 214) is selected (step S310), whether "Modify All Update Dates and Times to Older Ones Hereafter (O)" (the icon 230) is selected (step S311) and whether "Modify All Update Dates and Times to Newer Ones Hereafter (L)" (the icon 228) is selected (step S312). If no selections are made, it means cancel of the process. Thus, the process is ended.

In the input process of the dialog box D3 (FIG. 10) of such process, if "Yes to All Hereafter (A)" (the icon 214) is selected (YES at step S310), 1 is set to d (step S313). If "Modify All Update Dates and Times to Older Ones Hereafter (O)" (the icon 230) is selected (YES at step S311), 2 is set to d (step S314). If "Modify All Update Dates and Times to Newer ones Hereafter (L)" (the icon 228) is selected (YES at step S312), 3 is set to d (step S315).

A flowchart shown in FIG. 14 will be described. In the flowchart in FIG. 14, unless a file of the same name as the nth file in the copy source exists in the copy destination folder (NO at step S303), the nth file in the copy source is copied to the copy destination folder (step S316), 1 is applied to n at present, that is, a process of n=n+1 is executed (step S317) and the process returns to a main routine in FIG. 13 (step S302).

Unless d=0 (NO at step S306) or if d=1, d=2 and d=3 are set in each step S313, S314 and S315, the process moves to step S318. In step S318, it is confirmed whether d=1. If d=1 (YES at step S318), the nth file in the copy source is copied to the copy destination folder (step S316), 1 is added to present n, that is, the process of n=n+1 is executed (step S317) and the process returns to the main routine in FIG. 13 (step S302).

Unless d=1 (NO at step S318), it is confirmed whether the file in the copy source is newer than that in the copy destination (step S319). If the file is newer (YES at step S319), it is confirmed whether d=2 (step S320). If d=2 (YES at step S320), 1 is added to n at present, that is, a process of n=n+1 is executed (step S317) and the process returns to the main routine in FIG. 13 (step S302). Unless d=2 (NO at step S320), file date and time of a file of the same name as the nth file in the copy source is modified to identical date and time with that of the file in the copy source (step S321), 1 is applied to n at present, that is, the process of n=n+1 is executed (step S317) and the process returns to the main routine in FIG. 13 (step S302).

If the file in the copy source is older than that in the copy destination (NO at step S319), it is confirmed whether d=2 (step S322). If d=2 (YES at step S322), the file date and time of the file of the same name as the nth file in the copy source is modified to identical date and time with that of the file in the copy source (step S321), 1 is applied to n at present, that is, the process of n=n+1 is executed (step S317) and the process returns to the main routine in FIG. 13 (step S302). Unless d=2 (NO at step S322), 1 is applied to n at present, that is, the process of n=n+1 is executed (step S317) and the process returns to the main routine in FIG. 13 (step S302).

File dates and times are compared. If the file date and time of the nth file in the copy source coincides with that of the same name file in the copy destination (YES at step S305), 1 is applied to n at present, that is, the process of n=n+1 is executed (step S317) and the process returns to the main routine in FIG. 13 (step S302).

If "No (N)" is selected in the dialog box D3 (FIG. 10) (YES at step S308), 1 is applied to n at present, that is, the process of n=n+1 is executed (step S317) and the process returns to the main routine in FIG. 13 (step S302) as well.

If "Yes (Y)" is selected in the dialog box D3 (FIG. 10) (YES at step S309), the file date and time of the file of the same name as the nth file in the copy source is modified to identical date and time with that of the file in the copy source (step S321), 1 is applied to n at present, that is, the process of n=n+1 is executed (step S317) and the process returns to the main routine in FIG. 13 (step S302).

Figure 15:
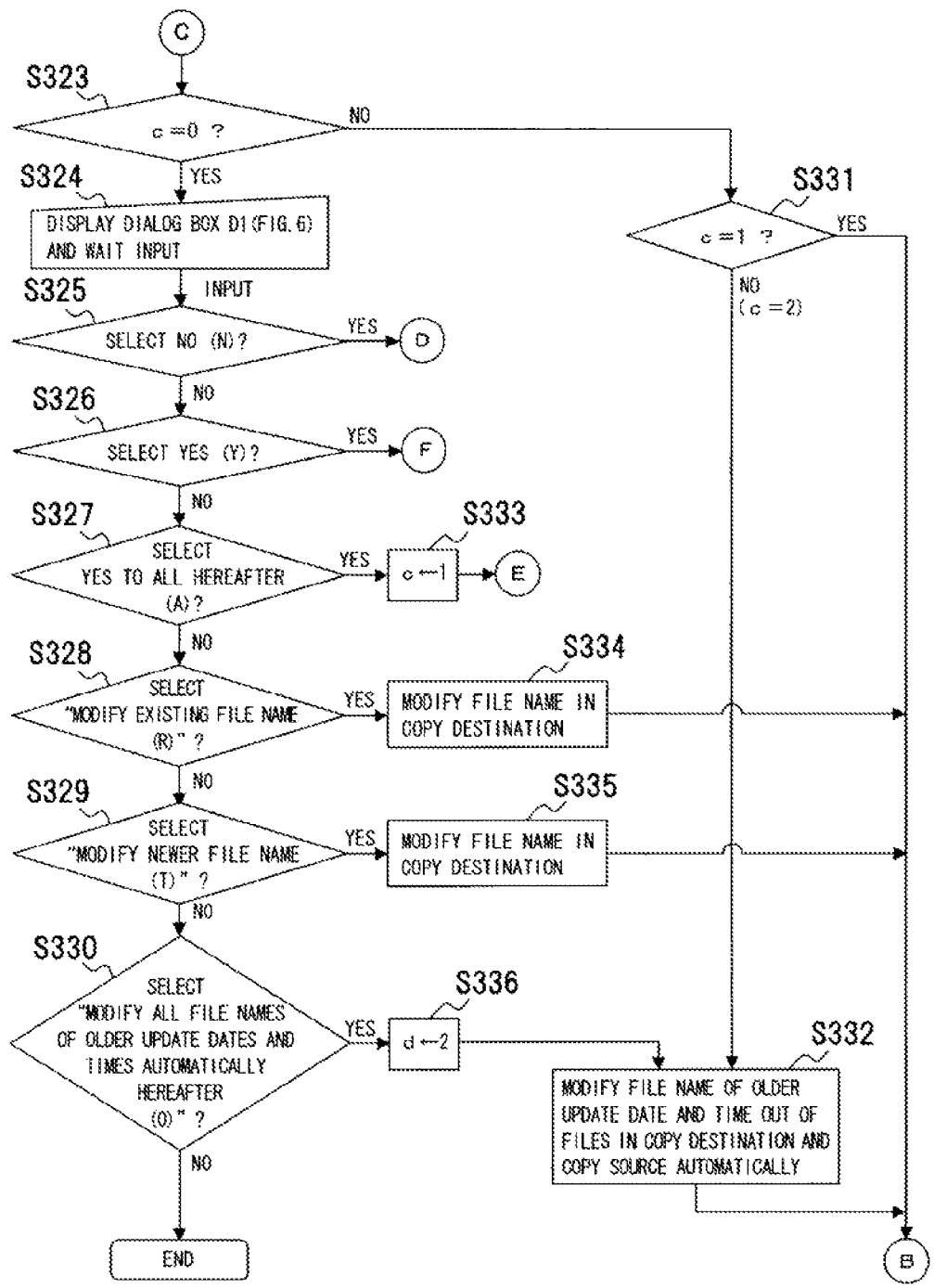
FIG. 15 is a flowchart showing a processing program for copying a plurality of files following FIG. 13.

A flowchart shown in FIG. 15 will be described. In the flowchart in FIG. 13, if the nth file's contents in the copy source and the contents of the same name file in the copy destination are different (NO at step S304), it is confirmed whether c=0 (step S323). If c=0 (YES at step S323), a dialog box D1 in FIG. 6 is displayed and an input from a user is waited (step S324).

About the input to the dialog box D1, it is determined that whether "No (N)" (the icon 216) is selected (step S325), whether "Yes (Y)" (the icon 212) is selected (step S326), whether "Yes to All Hereafter (A)" (the icon 214) is selected (step S327), whether "Modify Existing File Name (R)" (the icon 222) is selected (step S328), whether "Modify Newer File Name (T)" (the icon 224) is selected (step S329) and whether "Modify All File Names of Older Update Dates and Times Automatically Hereafter (O)" (the icon 226) is selected (step S330). If no selections are made, it means cancel of the process. Thus, the process is ended.

Unless c=0 (NO at step S323), it is confirmed whether c=1 (step S331). Unless c=1, that is, if c=2 (NO at step S331), a file name of older update date and time out of files in the copy destination and copy source is automatically modified (step S332) and the process moves to step S316 (FIG. 14). If c=1 (YES at step S331), the process moves to step S316 (FIG. 14).

Figure 14:
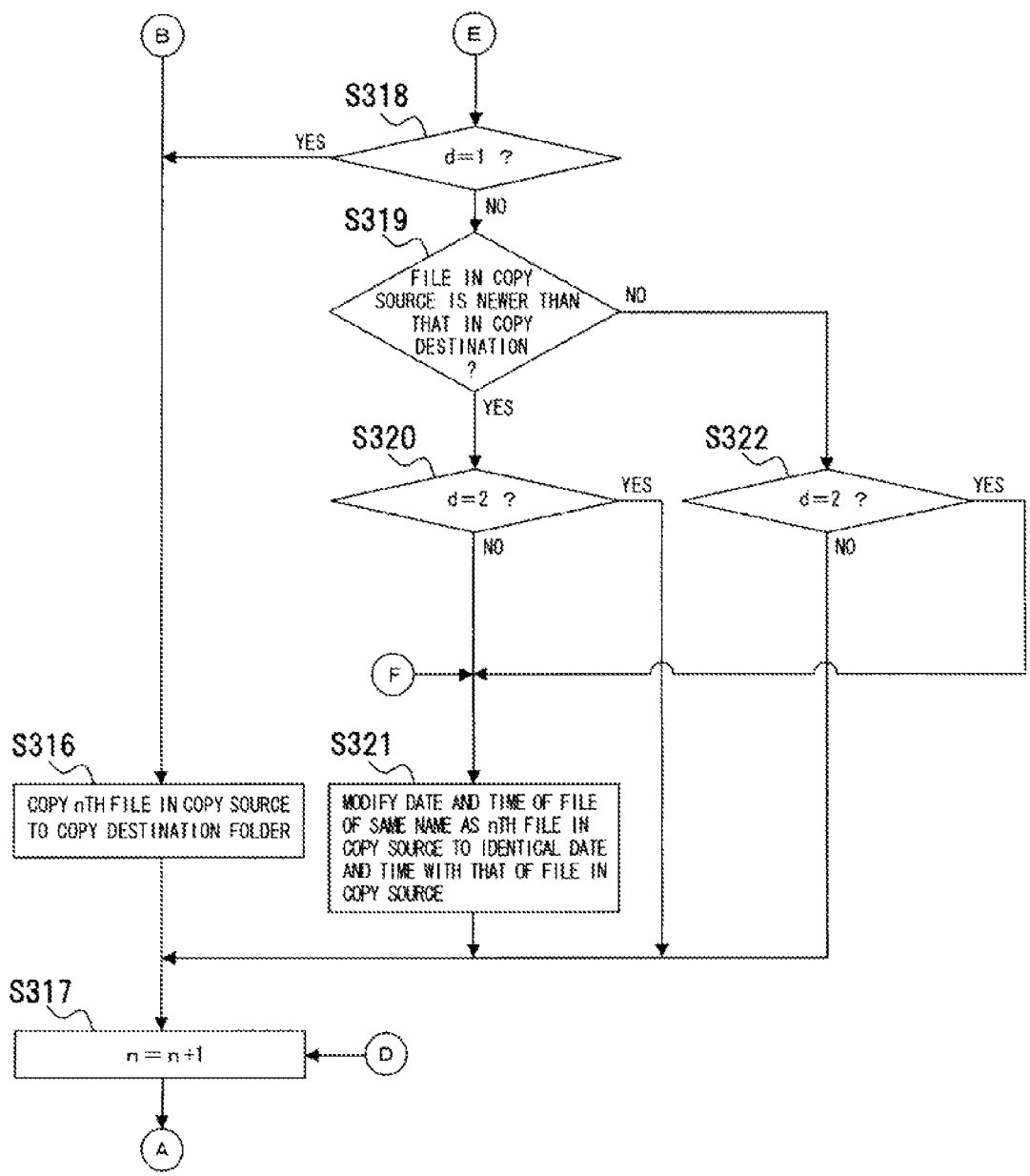
FIG. 14 is a flowchart showing a processing program for copying a plurality of files following FIG. 13.

Concerning the input on the dialog box D1, if "No (N)" is selected (YES at step S325), the process moves to step S317 (FIG. 14). If "Yes (Y)" is selected (YES at step S326), the process moves to step S321 (FIG. 14). If "Yes to All Hereafter (A)" is selected (YES at step S327), 1 is set in c (step S333) and the process moves to step S318 (FIG. 14).

If "Modify Existing File Name (R)" is selected (YES at step S328), the file name of the copy destination is modified (step S334) and the process moves to step S316 (FIG. 14). If "Modify Newer File Name (T)" is selected (YES at step S329), the file name of the copy destination is modified (step S335) and the process moves to step S316 (FIG. 14). If "Modify File Names of Older Update Dates and Times Automatically Hereafter (O)" is selected (YES at step S330), 2 is set to d (step S336), the file name of older update date and time out of the files in the copy destination and the copy source is automatically modified (step S332) and the process moves to step S316 (FIG. 14).

By the way, since c is initialized to 0 at first (c=0), if the nth file's contents in the copy source and the contents of the same name file in the copy destination do not coincide (NO at step S304), the dialog box D1 (FIG. 6) is displayed. In the dialog box D1, if the icon 214 of "Yes to All Hereafter (A)" is not selected, since c=0 is maintained, in the process at twice or over times, the dialog box D1 is displayed if the nth file's contents in the copy source and the contents of the same name file in the copy destination do not coincide.

In the dialog box D1, if the icon 214 of "Yes to All Hereafter (A)" is selected, since c is modified to 1 (c=1), c does not equal 0 (c≠0) after the process at the second time (NO at step S323). The dialog box D2 is not displayed. The process moves to the copying process via step S331.

In step S331, the case of c=2 (NO at step S331) is that the icon 226 of "Modify All File Names of Older Update Dates and Times Automatically Hereafter (O)" is selected in the dialog box D1. In this case, as to a file of the same name and different contents, the dialog box D1 is not displayed. A file name of older update date and time is automatically modified (step S332).

Figure 16:
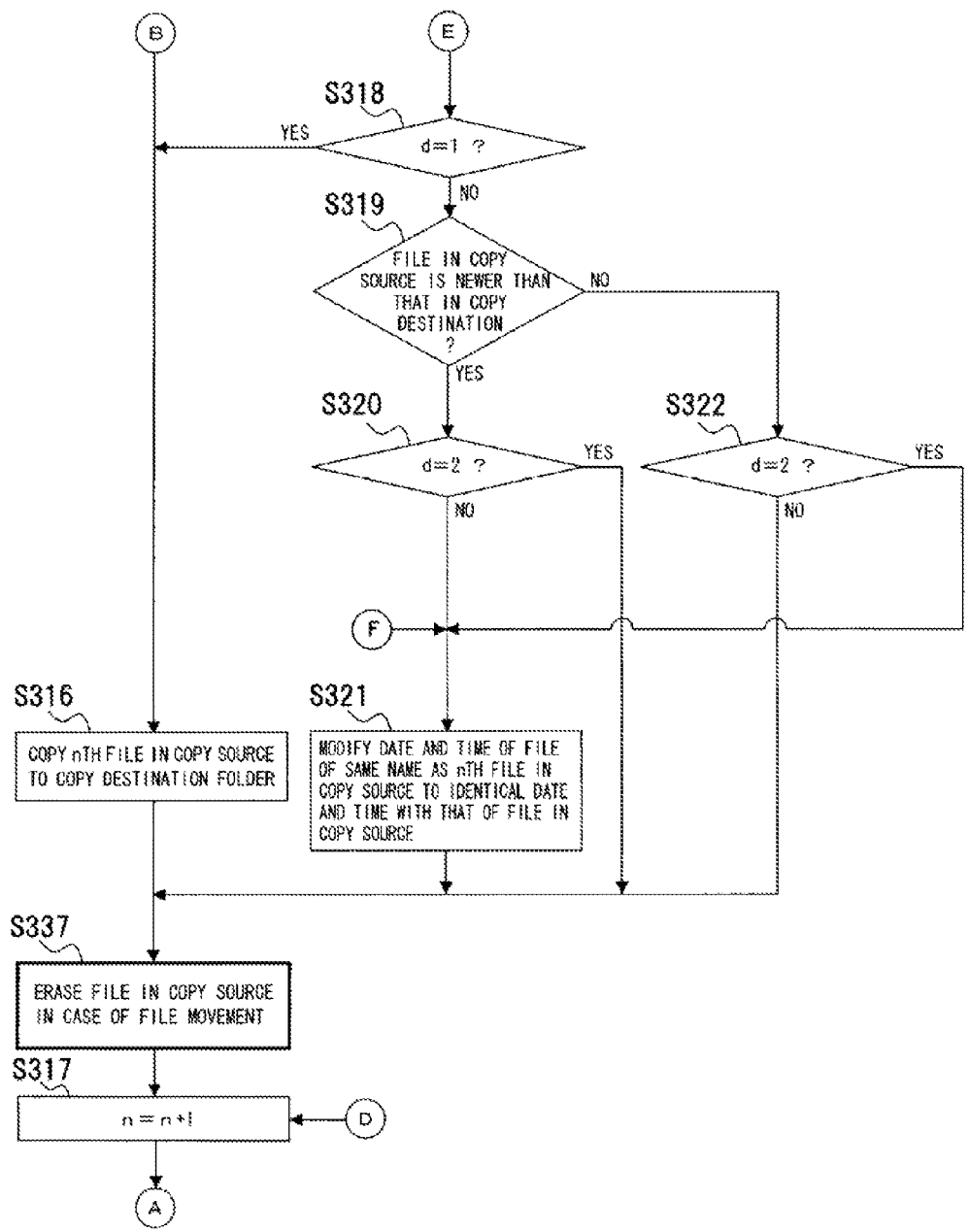
FIG. 16 is a flowchart showing a processing program for copying a plurality of files following FIG. 13.

In the embodiment, in case that a file is moved, for example as shown in FIG. 16, it may be structured that step S337 is set between step S316 and step S317, and in case of moving a file, a process of erasing the file in the copy source is executed.

Third Embodiment

Figure 17:
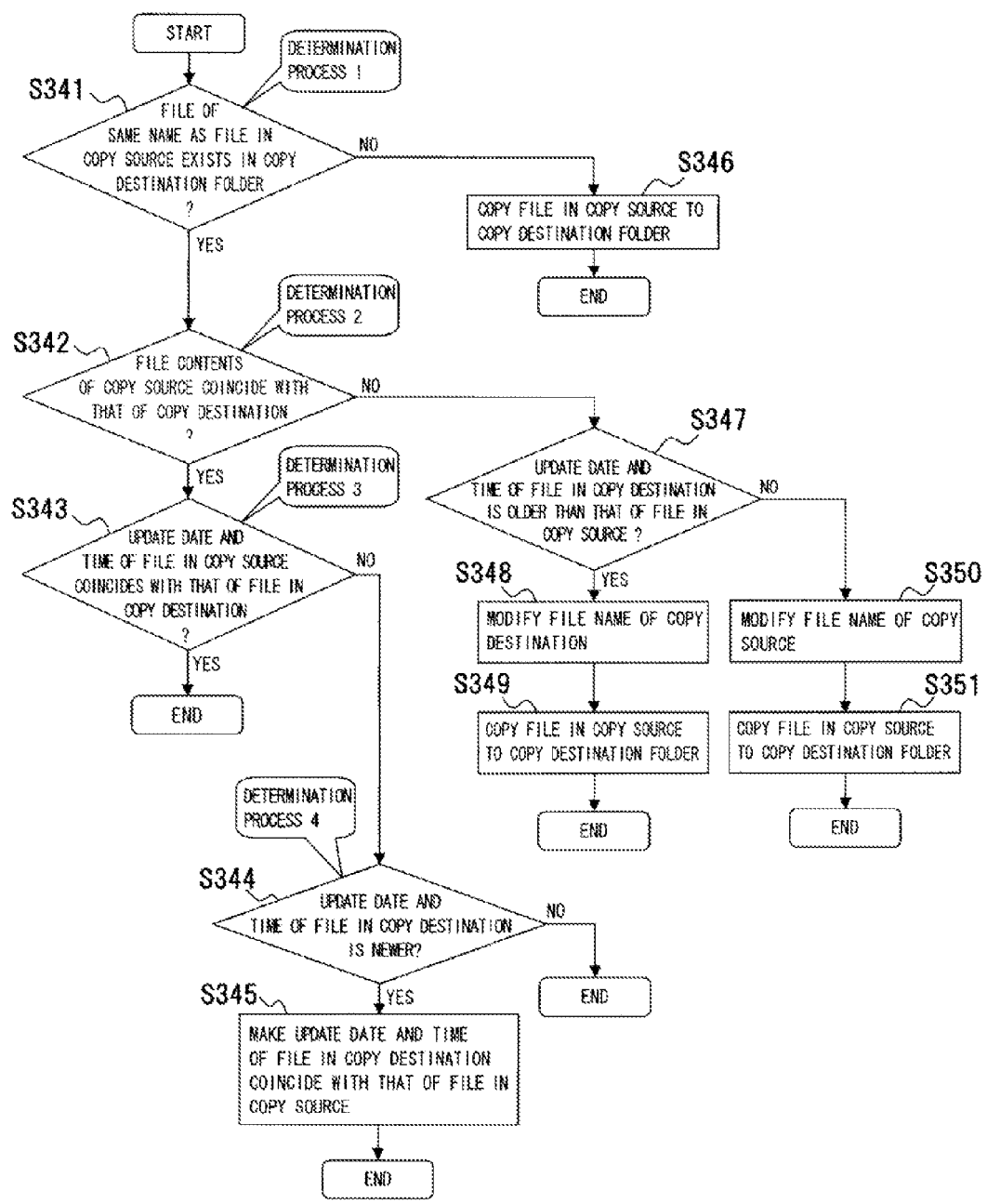
FIG. 17 is a flowchart showing a processing program for copying a file according to a third embodiment.
Figure 19:
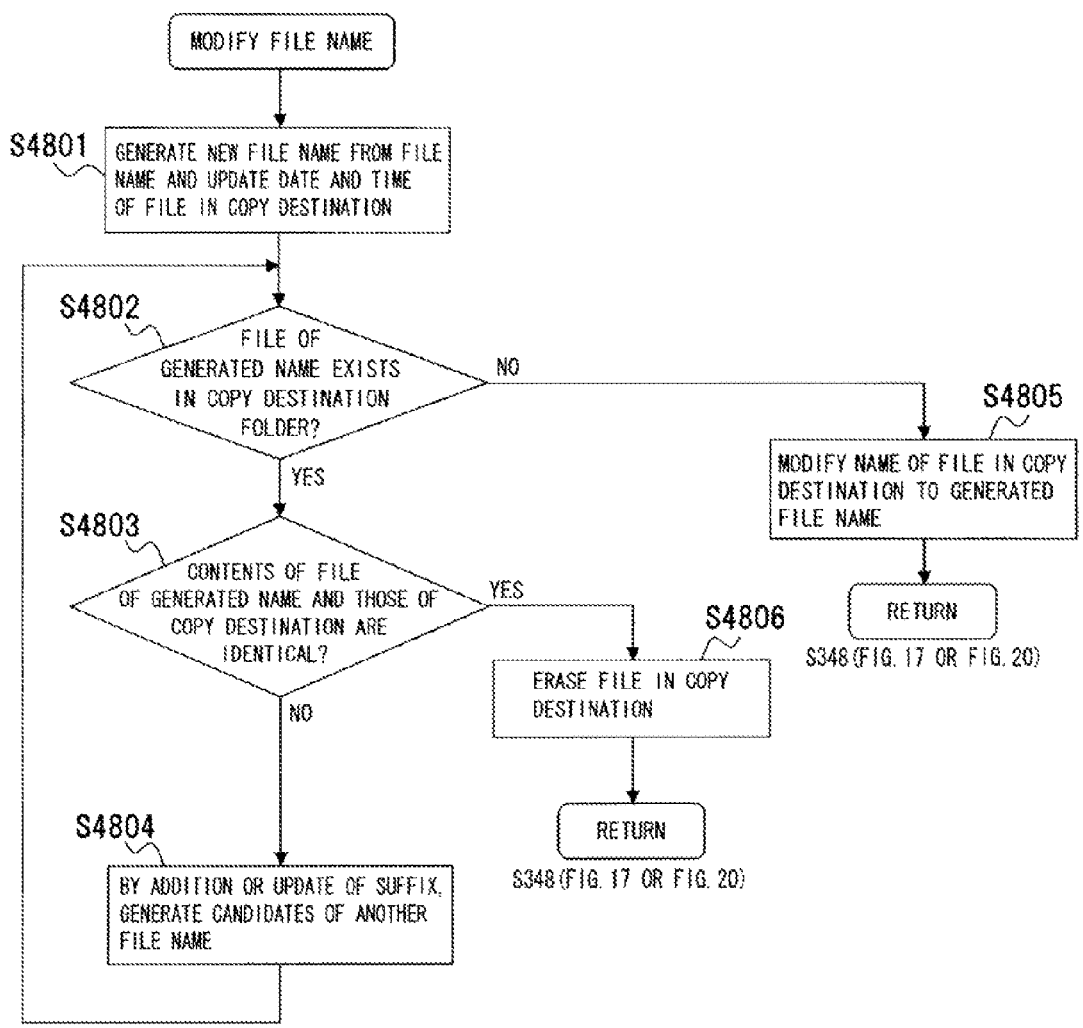
FIG. 19 is a flowchart showing a modifying process of a file name.
Figure 20:
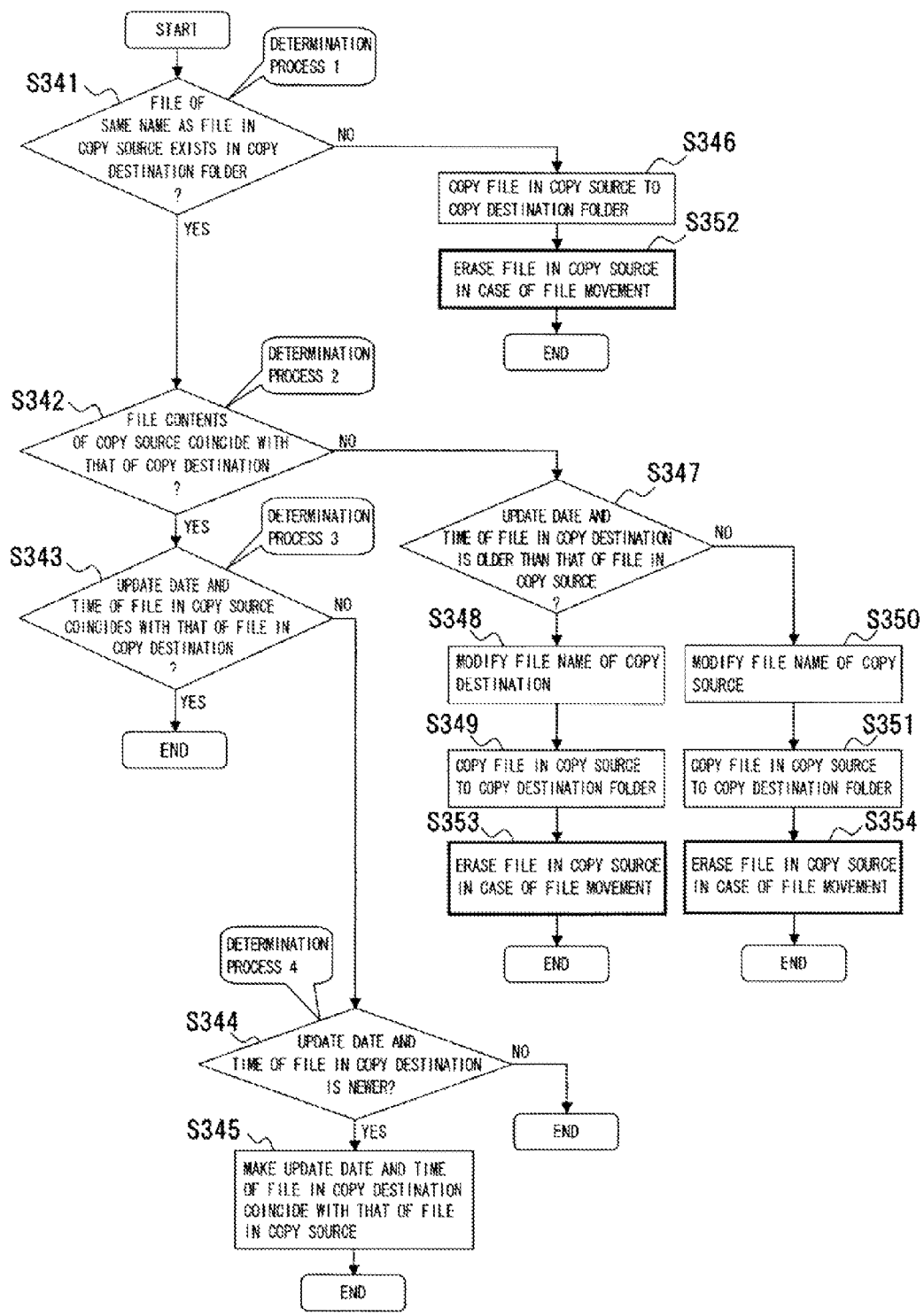
FIG. 20 is a flowchart showing a variation of a processing program for copying a file.

A third embodiment of the present invention will be described with reference to FIGS. 17, 18A to 18E, 19 and 20. FIG. 17 is a flowchart showing a processing program for copying a single file, FIGS. 18A to 18E depict file processes of each case corresponding to determination processes 1 to 4, FIG. 19 is a flowchart showing a modifying process of a file name and FIG. 20 is a flowchart showing a variation of a processing program for copying a file.

In the third embodiment, the above described PC 22 (FIG. 3) is used. Details thereof are as described above.

While the above described processes (FIGS. 13 to 16) represent the coping process of a plurality of files, this process represents a copying process of a single file as basic process procedure thereof. The process includes that in case a file of the same name as a file in a copy source exists in a copy destination and file contents thereof coincide, if file update date and time of the copy destination is newer, the file update date and time of the copy destination is made coincide with that of the copy source. In the embodiment, display of dialog boxes is omitted.

(Determination Process of a File of the Same Name: Determination Process 1)

It is determined whether a file of the same name as the file in the copy source exists in the copy destination folder (step S341).

(Determination Process of File Contents: Determination Process 2)

If a file of the same name exists (YES at step S341), a comparing process of files is executed and it is determined whether file contents of the files in the copy source and copy destination coincide (step S342).

(Determination Process Whether File Update Dates and Times Coincide: Determination Process 3)

If the file contents coincide (YES at step S342), it is determined whether file update dates and times of the files in the copy source and copy destination coincide (step S343). If the update date and time of each file coincides (YES at step S343), the process is ended.

(Determination Process of Update Date and Time: Determination Process 4)

Unless update date and time of each file coincides (NO at step S343), whether the update date and time of the file in the copy destination is newer is determined (step S344).

If the update date and time of the file in the copy destination is older (NO at step S344), the process is ended. If the update date and time of the file in the copy destination is newer (YES at step S344), the update date and time of the file in the copy destination is made coincide with that of the file in the copy source (step S345) and the process is ended.

Unless a file of the same name as the file in the copy source exists in the copy destination folder (NO at step S341), the file in the copy source is copied in the copy destination folder (step S346) and the process is ended.

Unless the file contents of the files in the copy source and copy destination coincide (NO at step S342), it is determined whether the update date and time of the file in the copy destination is older than that of the file in the copy source (step S347). If the update date and time of the file in the copy destination is older (YES at step S347), the filename of the file in the copy destination is modified (step S348), the file in the copy source is copied to the copy destination folder (step S349) and the process is ended. If the update date and time of the file in the copy destination is newer (NO at step S347), the file name of the file in the copy source is modified (step S350), the file in the copy source is copied to the copy destination folder (step S351) and the process is ended.

In this copying process of a single file, if a file of the same name as the file in the copy source exists in the copy destination and the contents thereof do not coincide, it may be structured that copying is executed after the file name of older update date and time is modified. The modifying process of the file name may be either a manual process or an automatic process.

The above described determination processes 1 to 4 will be described with reference to FIGS. 18A to 18E. FIGS. 18A to 18E depict a file process of each case corresponding to determination processes 1 to 4.

If the file name of a copy source folder is, for example, "abc.jpg-", following cases are assumed.

(Case 1)

Figure 18A:
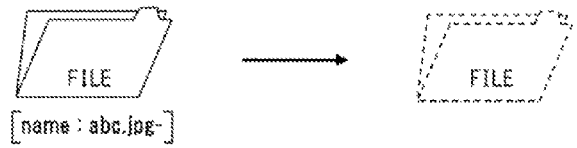
FIGS. 18A to 18E depict file processes of each case corresponding to determination processes 1 to 4.

Case 1 is that, as shown in FIG. 18A, the file whose name is "abc.jpg-" does not exist in the copy destination folder.

This case 1 becomes "NO" in the determination process (step S341) and the file of the copy source is copied to the copy destination folder (step S346). Here, "copying" means processing operation that existence of a file is generated in the copy destination folder, and file contents is identical with that of the copy source and file update date and time is also identical with that of the file in the copy source.

(Case 2)

Figure 18B:
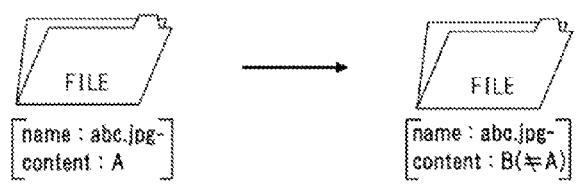

Case 2 is that, as shown in FIG. 18B, the file whose name is "abc.jpg-" exists in the copy destination folder and contents thereof is different from that of the file in the copy source. That is, case 2 is an occasion of "YES" at the determination process 1 (step S341).

In case 2, since the file whose name is "abc.jpg-" exists in the copy destination folder, the comparing process of the file contents (determination process 2: step S342) is executed. In advance of check of identity of the file contents, file sizes are compared. If the file sizes are different, the files are decided to have different file contents (not coincide). If the file sizes are identical, the file contents are compared. In this case, the contents of each file is compared, for example, by 1 byte from a head of the file. If a different part of at least 1 byte exists, it is determined that the file contents are different.

If the file contents do not coincide (NO at step S342), it is determined whether update date and time of a file in the copy destination is older than that of the file in the copy source, and the file name of the copy destination or copy source is modified. That is, in addition to automatic modification of the file name, the file is copied and a process is executed that both files are left in the copy destination folder. As to modification of the file name, the file name of older update date and time is, for example, modified to "abc-20050602-1450.jpg".

When the file name is modified, in case same file name as a file name to be renamed already exists, the contents of the already existing file are compared. Incase of the same contents, copying is not executed. In case of different contents, it is considered that another file was created at the same date and time. The file name may be modified, for example, "abc-20050602-1450a.jpg-" or the file may be erased. If erased, two files of the same name and different contents are generated within a predetermined time, e.g., one minute. Since they are older than the file to be copied, it is generally enough that one of them remains.

(Case 3)

Figure 18C:
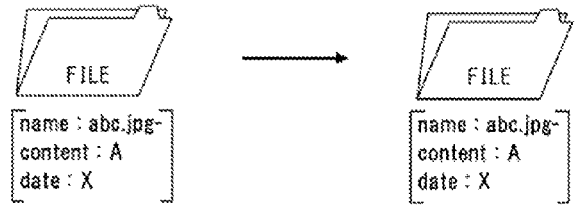

Case 3 is that, as shown in FIG. 18C, the file whose name is "abc.jpg-" exists in the copy destination folder and both of the file contents and update date and time thereof coincide with those of a file in the copy source.

In this case, it is determined that the file in the copy source completely coincides with that in the copy destination. Since there is no meaning to copy, the process is ended without copying.

(Cases 4 and 5)

Figure 18D:
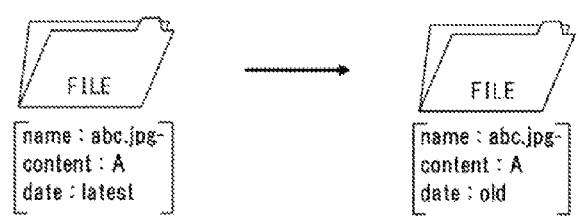

Case 4 is that, as shown in FIG. 18D, the file whose name is "abc.jpg-" exists in the copy destination folder and the file contents thereof coincide with a file in the copy source but file update date and time of the file in the copy destination is older.

Figure 18E:
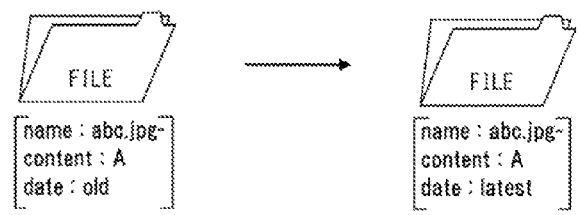

Case 5 is that, as shown in FIG. 18E, the file whose name is "abc.jpg-" exists in the copy destination folder and the file contents thereof coincide with that of a file in the copy source but update date and time of the file in the copy destination is newer.

In such cases 4 and 5, it is assumed that the files whose contents are identical but update dates and times are different exist in the copy source and copy destination. In the copying process of a file in the PC 22, such file creation cannot be assumed. Since concerning a file attached to -e-mail and a file taken in from an http-server, update date and time thereof is the time point when the PC 22 takes the file in, it is predicted that a file of the same name but different update date and time is generated in the PC 22. It is in vain for memory to store an identical file of different update date and time as another file in a hard disc, thus, the file is treated as the identical.

In case of files of identical contents but one has newer update date and time and the other has older one, the file of older update date and time may be set as original one as a manner supposing any one of the files as original. Suppose either of the file in the copy source or the file in the copy destination is original, the file of original update date and time of the original may be left. Thus, in determination process 4 (step S344), if it is determined that the file in the copy destination is newer, the update date and time of the file in the copy destination is modified to that of the file in the copy source (step S345).

The modifying process of the file name (step S348 in FIG. 17) will be described with reference to FIG. 19. FIG. 19 is a flowchart showing a modifying process of a file name.

From a file name and update date and time of an existing file in the copy destination, a file name (a new file name) is generated (step S4801). In this case, the new file name uses the update date and time information for identification. For example, a file name existing in the copy destination is "-abc.jpg" and update file date and time thereof is "17:30 on May 31, 2005", a new file name, "-abc-20050531-1730.jpg" is generated. That is, it is an update of the file name in view of the update date and time.

Whether the file of the generated file name exists in the copy destination folder or not is determined (step S4802). If the file of the generated file name already exists in the copy destination folder (YES at step S4802), whether file contents of the file of the generated file name and the file in the copy destination are identical or not is determined (step S4803).

If the contents of the file of the generated file name are different from those of the file in the copy destination (NO at step S4803), by addition or update of a suffix to the file name, etc., candidates of the file name are generated (step S4804) and the process returns to step S4802.

In a generation process of the file name in step S4804, if an identical file name is, for example, "-abc-20050531-1730.jpg", a candidate, "-abc-20050531-1730a.jpg-", to which a suffix "a" is added, is generated, and as a result of retrieving the candidate name, if the candidate name exists, for example, "abc-20050531-1730b.jpg-" is generated as the file name in which the suffix "a" is modified to a suffix "b". As a result of retrieving the candidate name, if not existing, the candidate name is generated as a new file name.

If the file of the generated name does not exist in the copy destination folder (NO at step S4802), the name of the file in the copy destination is modified to the generated file name (step S4805), and the process is ended and returns to step S348 (FIG. 17).

If the contents of the file of the generated name are identical with those of the file existed in the copy destination folder (YES at step S4803), the file in the copy destination is erased (step S4806), and the process is ended and returns to step S348 (FIG. 17). Erasing the file contributes to reducing memory in a recording medium because of erasing the unnecessary file of the same name and contents.

By the way, as to an example of such file process, description will be made with reference to a concrete example. As a premise for example, a file name of the copy source is "abc.jpg-", and files of different contents, whose names are "abc.jpg-" and "abc-20050531-1780.jpg", exist in the copy destination. First, in case the file "abc.jpg-" in the copy source is copied to the copy destination folder, another file of the different contents, "abc.jpg-", exists in the copy destination. Since the file contents are different, both of them are wanted to be stored.

In this case, to modify the file in the copy destination, a new file name is generated. In this example, "abc-20050531-1780.jpg" is generated as the file name. If the file of the same name as the generated file name does not exist in the copy destination, after the file name "abc.jpg-" of the copy destination is modified to "abc-20050531-1780.jpg", the file in the copy source, whose name is "abc.jpg-", is copied to the copy destination, and the copying process is ended.

Here, in case that the file in the copy destination, "abc.jpg-", is being modified to the file "abc-20050531-1780.jpg", if another file of the same name "abc-20050531-1780.jpg" (it is unknown whether file contents thereof are identical) exists in the copy destination, it is a problem whether the contents of the file whose name is "abc.jpg-" are identical with those of the file "abc-20050531-1780.jpg" in the copy destination or not. If both of the file contents coincide, although the file of the name "abc.jpg-" existing in the copy destination is erased, since the file of the same contents remains as a file whose name is "abc-20050531-1780.jpg" to be stored, there is no problem. The file of the name "abc.jpg-" in the copy destination is erased. Afterward, the file of the name "abc.jpg-" in the copy source is overwritten on the file of the name "abc.jpg-" in the copy destination. If the file contents do not coincide, there is a request that the file of the name "abc.jpg-" in the copy source, the files of the name "abc.jpg-" and "abc-2050531-1780.jpg" in the copy destination are left. Thus, a file name that a suffix like "abc-20050531-1780a.jpg-" is added to the file name "abc.jpg-" in the copy destination is generated. The process is repeated till the state where the files of non-overlapped and overlapped names have totally identical file contents, thus file names and contents are arranged.

In the embodiment, in case of file movement, for example as shown in FIG. 20, it may be configured that step S352 is set after step S346 and a process of erasing the file of the copy source is executed. It may be configured that Steps S353 and S354 are set after step S349 or S351 and the process of erasing the file in the copy source is executed, as well.

Fourth Embodiment

Figure 21:
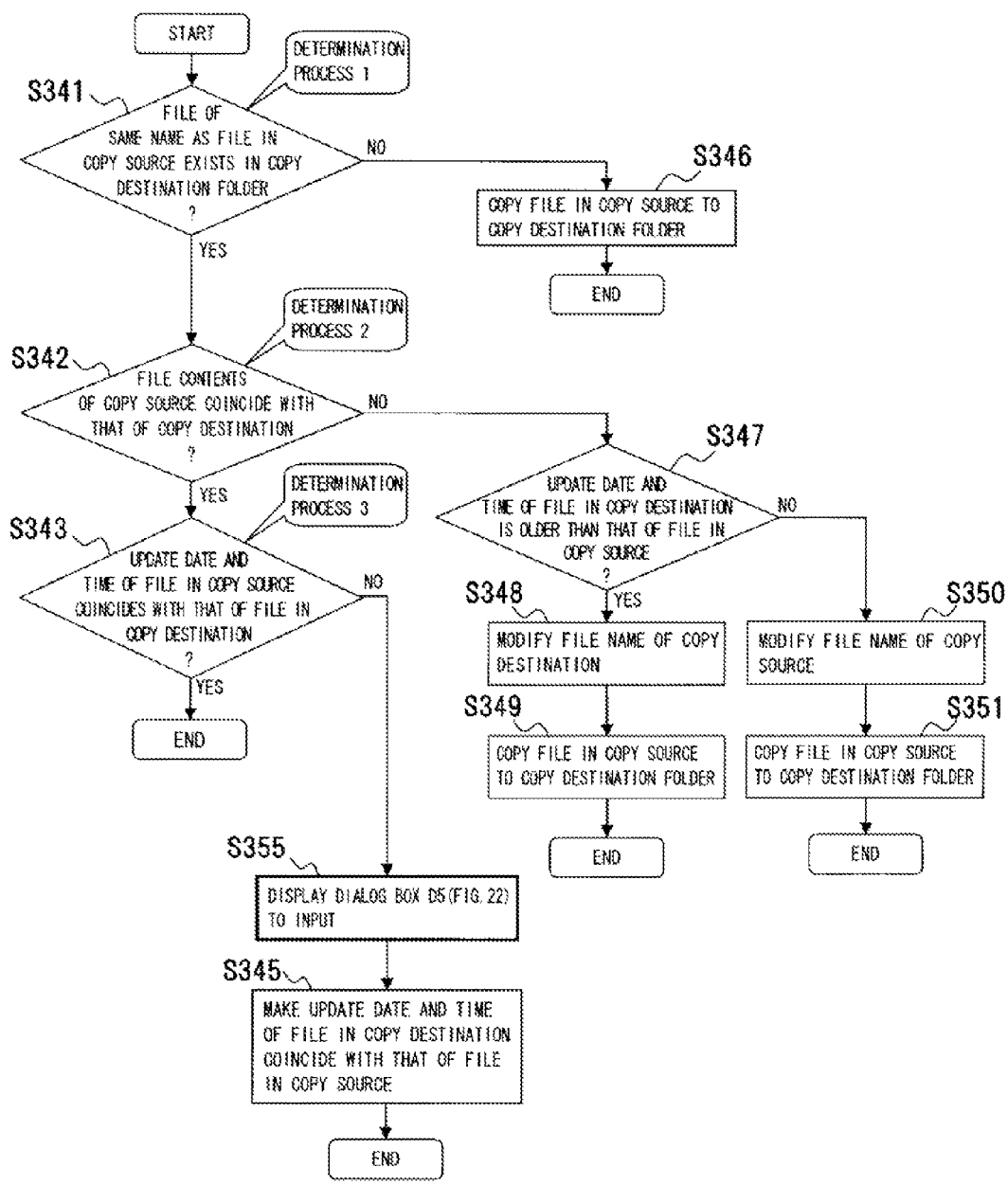
FIG. 21 is a flowchart showing a processing program for copying a file according to a fourth embodiment.
Figure 22:
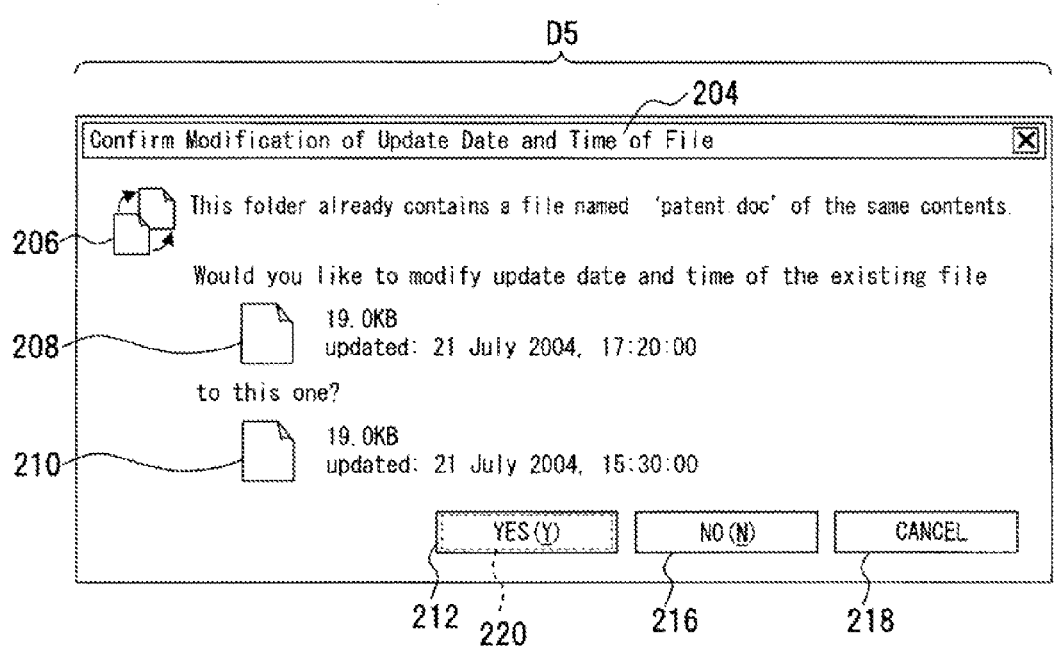
FIG. 22 is an example of a dialog box used for confirmation of modifying file date and time.
Figure 23:
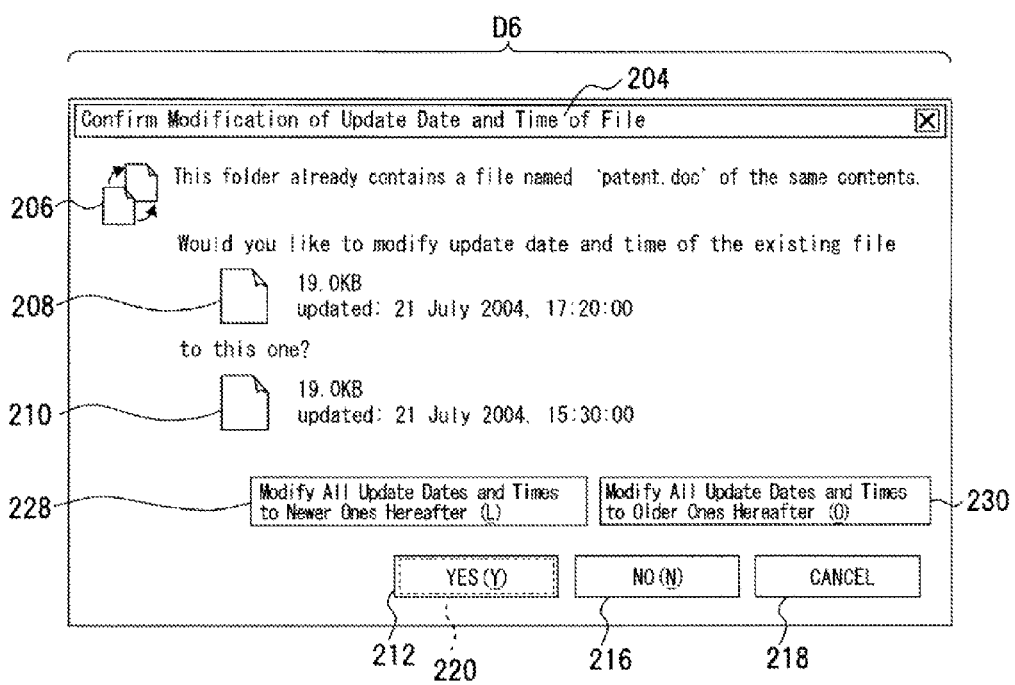
FIG. 23 depicts another dialog box used for confirmation of modifying file date and time.

A fourth embodiment of the present invention will be described with reference to FIGS. 21, 22, and 23. FIG. 21 is a flowchart showing a processing program for copying a single file, FIGS. 22 and 23 are an example of a dialog box used for confirmation of modifying file update date and time. In FIG. 21, the same components as the same parts of a flowchart in FIG. 17 or 20 are denoted by the same reference numerals, and the description is omitted.

In the fourth embodiment, the above described PC 22 (FIG. 3) is also used. Details thereof are as described above.

In the copying process of a single file showing in FIG. 17, in case the dialog box is displayed and a process is selected by a user, as shown in FIG. 21, it may be configured that step S355 is set before the stage of step S345, a dialog box D5 (FIG. 22) is displayed and modification of file update date and time is confirmed.

In this case, in the dialog box D5, as shown in FIG. 22, it is displayed as file information on a title bar 204 that "Confirm Modification of Update Date and Time of File", an icon 206 representative of the process of copying or moving a file, icons 208 and 210 representative of files, "This folder already contains a file named 'patent.doc' of the same contents.", "Would you like to modify update date and time of the existing file 19.0 KB updated: 21 Jul. 2004, 17:20:00 to this one?

19.0 KB updated: 21 Jul. 2004, 15:30:00"

as file size and update dates and times thereof, for example, and icons 212, 216 and 218 for inputting a response. It is displayed that on the icon 212, "Yes (Y)" representative of an affirmation input, on the icon 216, "No (N)" representative of a negation input, and on the icon 218, "Cancel" representative of an input for cancelling the process.

By such selection input from the dialog box D5 (FIG. 22), after confirmation whether the file update date and time can be modified, the process returns to step S345 (FIG. 21).

In the copying process of a single file shown in FIG. 17, in case step S355 is set before the stage of step s345, it may be configured that a dialog box D6 (FIG. 23) is displayed and modification of the file update date and time is confirmed.

In this case, in the dialog box D6, as shown in FIG. 23, it is displayed as file information on the title bar 204 that "Confirm Modification of Update Date and Time of File", the icon 206 representative of the process of copying or moving a file, the icons 208 and 210 representative of files, "This folder already contains a file named 'patent.doc' of the same contents.", "Would you like to modify update date and time of the existing file 19.0 KB updated: 21 Jul. 2004, 17:20:00 to this one?

19.0 KB updated: 21 Jul. 2004, 15:30:00"

as file sizes and update dates and times thereof, for example, and icons 212, 216, 218, 228 and 230 for inputting a response. It is displayed that on the icon 212, "Yes (Y)" representative of an affirmation input, on the icon 216, "No (N)" representative of a negation input, on the icon 218, "Cancel" representative of an input for cancelling the process, on an icon 228, "Modify All Update Dates and Times to Newer Ones Hereafter (L)" and on the icon 230, "Modify All Update Dates and Times to Older Ones Hereafter (O)".

By such selection input from the dialog box D6 (FIG. 23), it may be configured that after confirmation of whether the update date and time of the file can be modified, the process returns to step S345 (FIG. 21).

Fifth Embodiment

Figure 24:
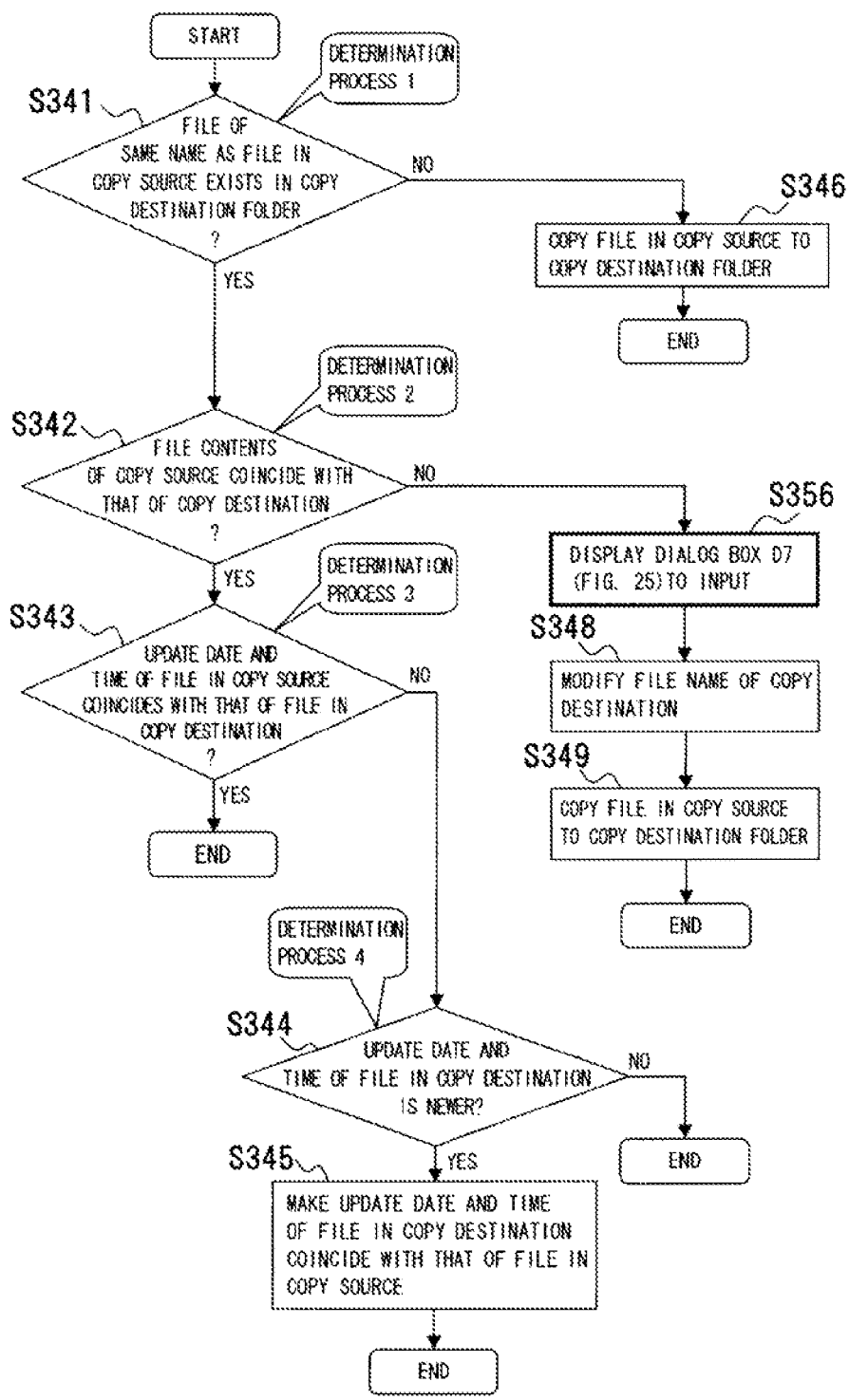
FIG. 24 is a flowchart showing a processing program for copying a file according to a fifth embodiment.
Figure 25:
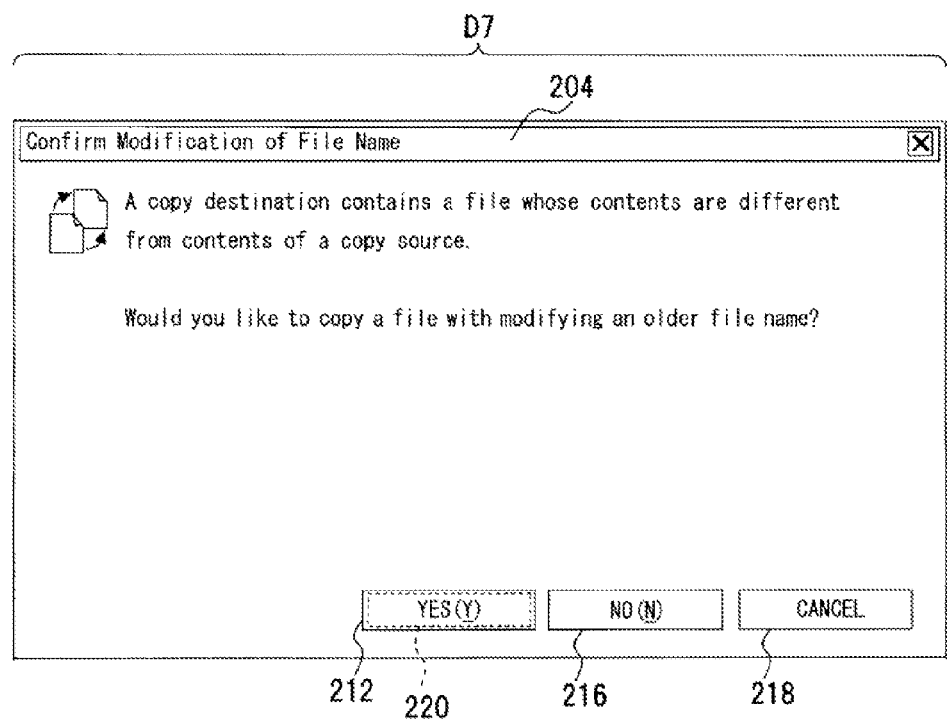
FIG. 25 depicts an example of a dialog box used for confirmation of modifying a file name.

A fifth embodiment of the present invention will be described with reference to FIGS. 24 and 25. FIG. 24 is a flowchart showing a processing program for copying a single file and FIG. 25 depicts an example of a dialog box. In FIG. 24, the same components as the same parts of the flowchart in FIG. 17 or 20 are denoted by the same reference numerals, and the description thereof is omitted.

In the fifth embodiment, the above described PC 22 (FIG. 3) is also used. Details thereof are as described above.

In the copying process of a single file showing in FIG. 17, in case the dialog box is displayed and a process is selected by a user, as shown in FIG. 24, it may be configured that step S356 is set before the stage of step S348, a dialog box D7 (FIG. 25) is displayed and file name modification is confirmed.

In this case, in the dialog box D7, as shown in FIG. 25, it is displayed as file information on a title bar 204 that "Confirm Modification of File Name", "A copy destination contains a file whose contents are different from contents of a copy source.

Would you like to copy a file with modifying an older file name?", and icons 212, 216 and 218 for inputting a response. It is displayed that on the icon 212, "Yes (Y)" representative of an affirmation input, on the icon 216, "No (N)" representative of a negation input, and on the icon 218, "Cancel" representative of an input for cancelling the process.

By such selection input from the dialog box D7 (FIG. 25), after confirmation of whether the file name can be modified, the process returns to step S348 (FIG. 24).

Sixth Embodiment

Figure 26:
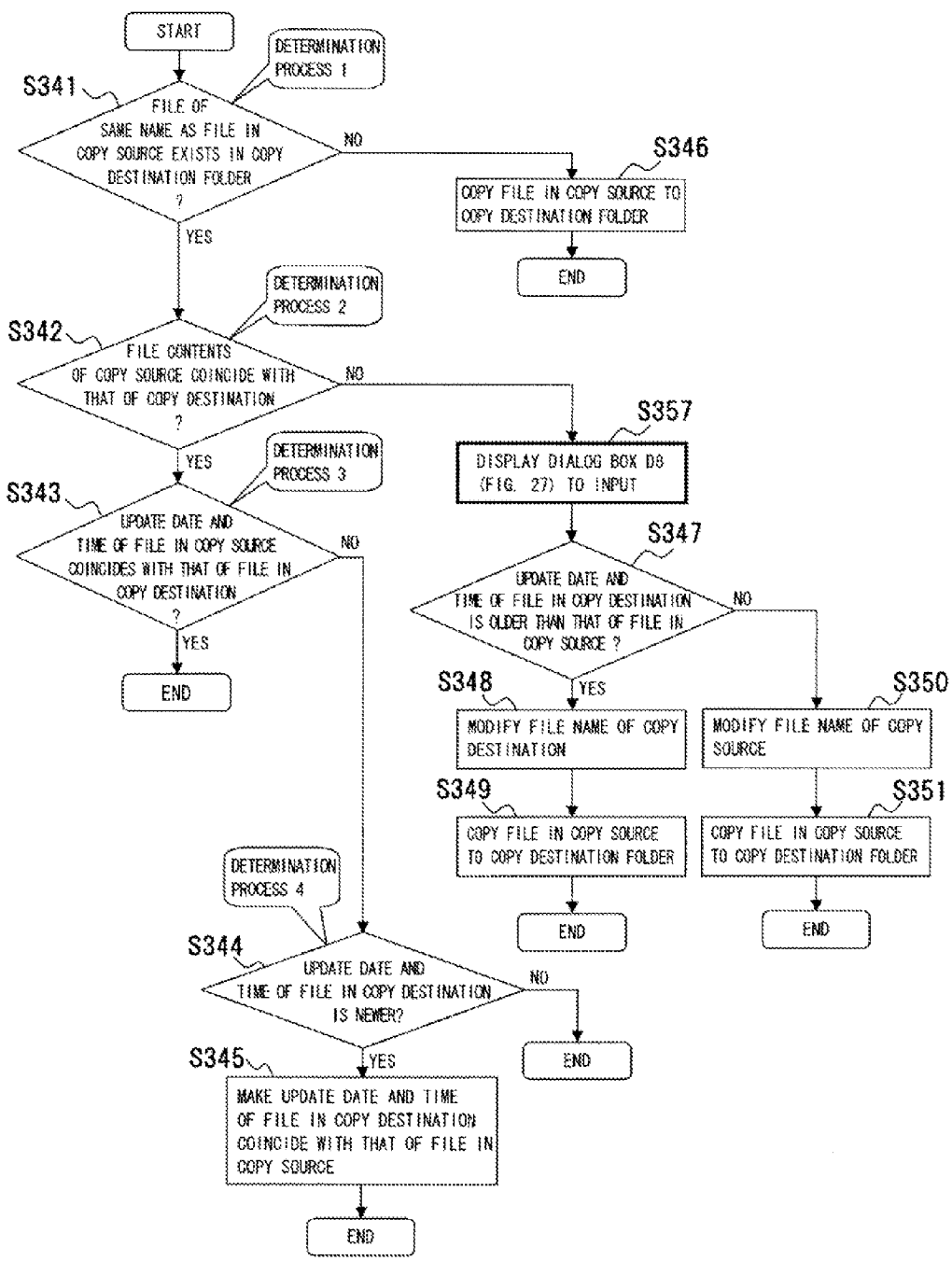
FIG. 26 is a flowchart showing a processing program for copying a file according to a sixth embodiment.
Figure 27:
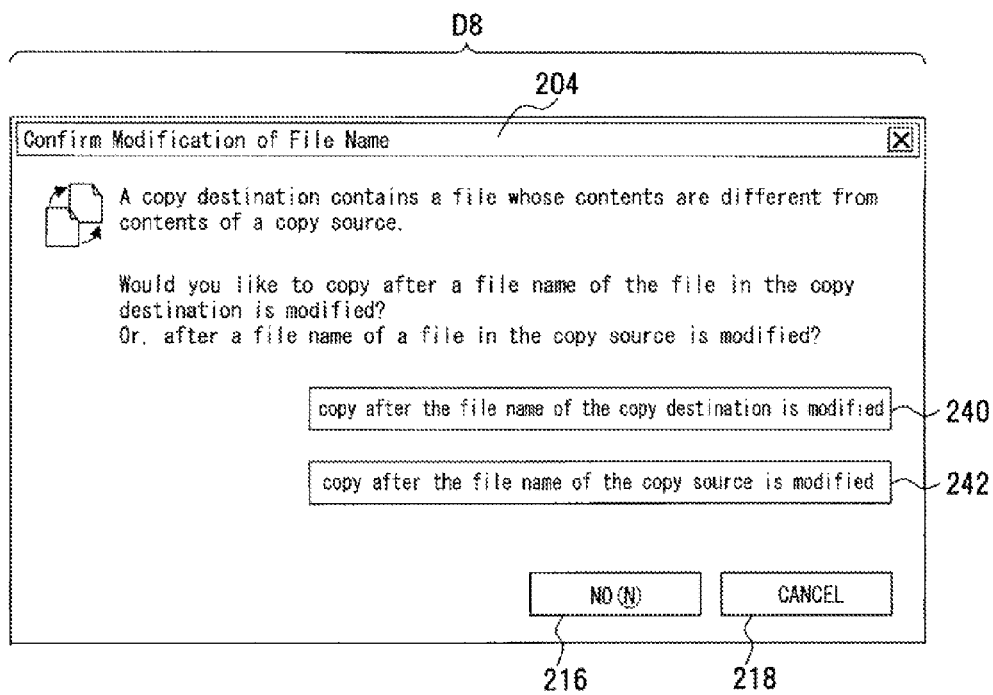
FIG. 27 depicts an example of a dialog box used for confirmation of modifying a file name.

A sixth embodiment of the present invention will be described with reference to FIGS. 26 and 27. FIG. 26 is a flowchart showing a processing program for copying a single file and FIG. 27 depicts an example of a dialog box. In FIG. 26, the same components as the same parts of the flowchart in FIG. 17 or 20 are denoted by the same reference numerals, and the description thereof is omitted.

In the sixth embodiment, the above described PC 22 (FIG. 3) is used. Details thereof are as described above.

In the copying process of a single file showing in FIG. 17, in case the dialog box is displayed and s process is selected by a user, as shown in FIG. 26, it may be configured that step S357 is set before the stage of step S347, a dialog box D8 (FIG. 27) is displayed and file name modification is confirmed.

In this case, in the dialog box D8, as shown in FIG. 27, it is displayed as file information on a title bar 204 that "Confirm Modification of File Name", "A copy destination contains a file whose contents are different from contents of a copy source.

Would you like to copy a file after a file name of copy destination is modified?

Or, after a file name of the copy source is modified?", and icons 216, 208, 240 and 242 for inputting a response. It is displayed that on the icon 216, "No (N)" representative of a negation input, on the icon 218, "Cancel" representative of an input for cancelling the process, on the icon 240, "copy after modification of the file name of the copy destination", and on the icon 242, "copy after modification of the file name of the copy source".

By such selection input from the dialog box D8 (FIG. 27), after confirmation of whether the file name can be modified, the process returns to step S347 (FIG. 17).

Seventh Embodiment

Figure 28:
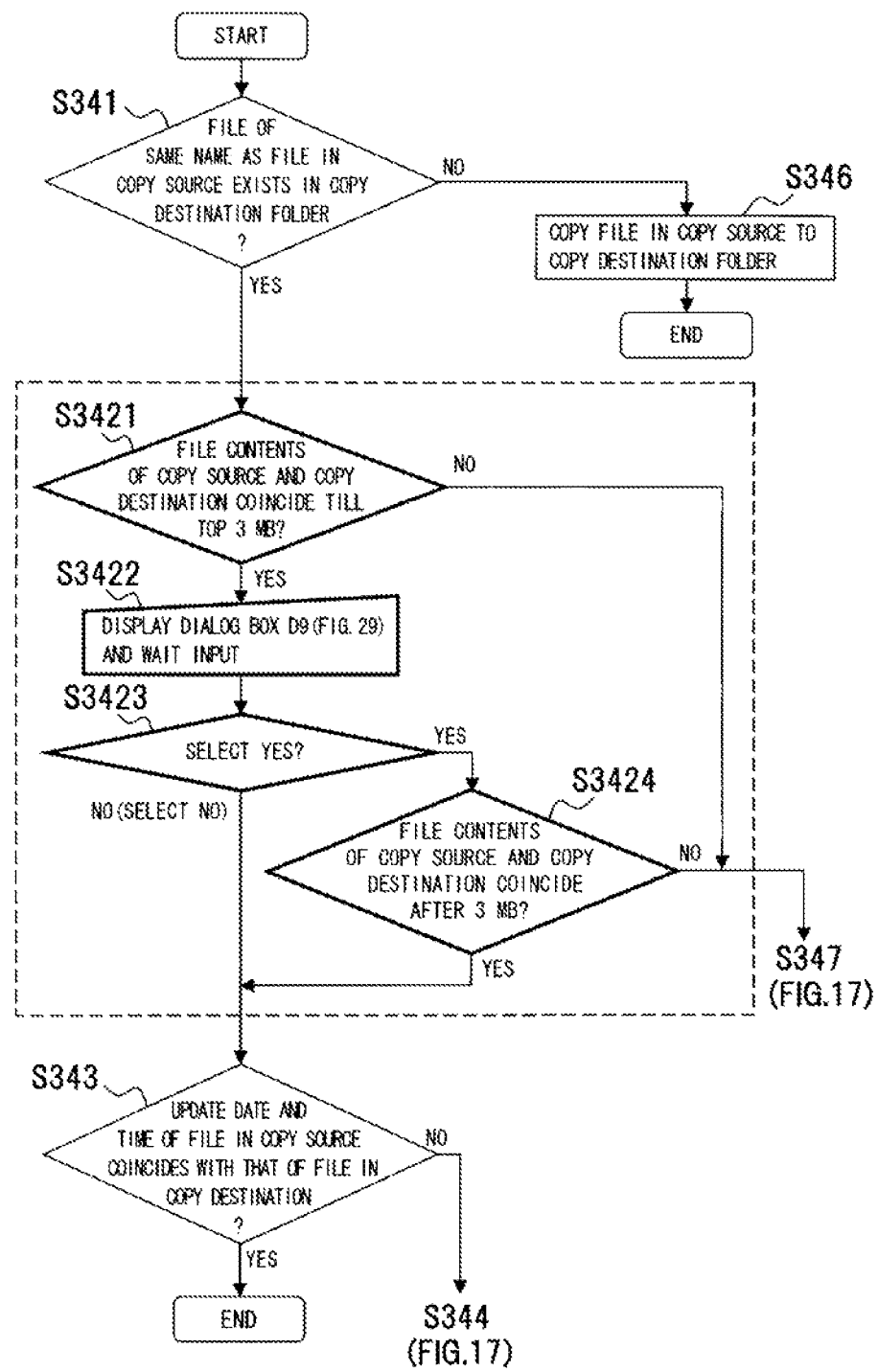
FIG. 28 is a flowchart showing a process of assuming that file size is huge according to a seventh embodiment.
Figure 29:
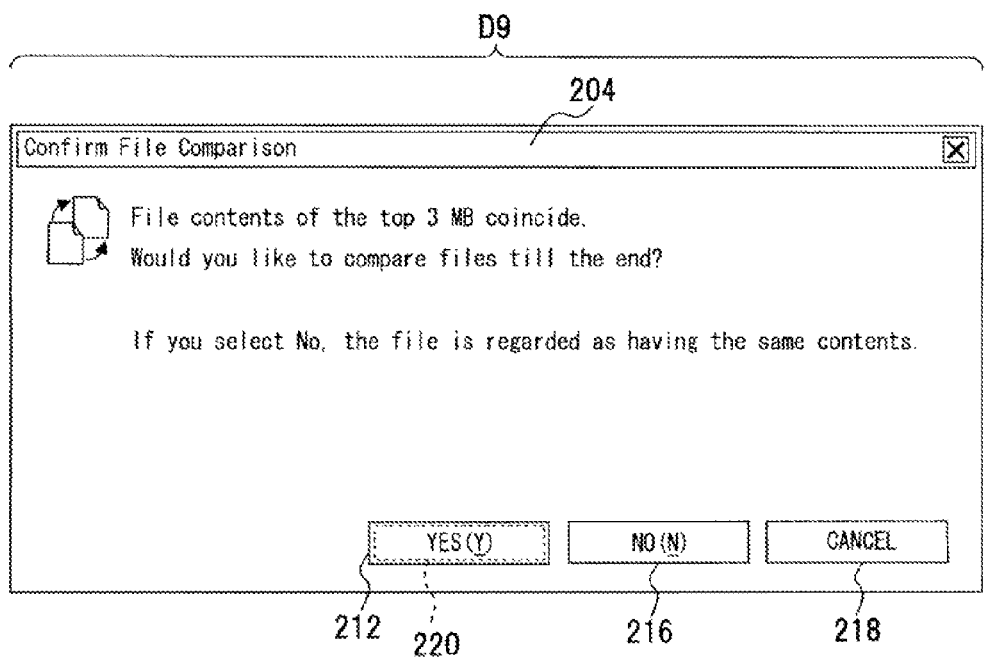
FIG. 29 depicts an example of a dialog box used for confirmation of comparing files.

A seventh embodiment of the present invention will be described with reference to FIGS. 28 and 29. FIG. 28 is a flowchart showing a comparing process of assuming that file size is huge and FIG. 29 depicts a dialog box according to the seventh embodiment. In FIG. 28, the same components as the same parts of the flowchart in FIG. 17 or 20 are denoted by the same reference numerals, and the description thereof is omitted.

As aspect of comparing file contents, if file size of compared files are different, there is no need for comparing the file contents (data) to know that the file contents do not coincide. Thus, if the file sizes do not coincide, the file contents may be processed as noncoincidence without comparing the contents thereof.

In the embodiment, a file whose size is over some part of size, for example, 3 MB is considered as a huge file. If contents within the range from the top of the file till 3 MB coincide, a user (an operator) is inquired whether the file contents of the following part are considered as coinciding or the comparing is continued till the end, so that the comparing process is made. In this case, it is an example whether a file over 3 MB is regarded as a huge file. File size may be under or over 3 MB.

As shown in FIG. 28, in the copying process of a file, it is determined whether a file of the same name as a file in a copy source exists in a copy destination folder (step S341: FIG. 17 or FIG. 20). For example, in case file contents within the range from the top of the file till 3 MB as a predetermined range coincide, as shown in FIG. 29, a dialog box D9 representative of a comparing result from the top till 3 MB is displayed. In the dialog box D9, for example, "confirm file comparison" is displayed in a title bar 204 and "File contents of the top 3 MB coincide.
Would you like to compare files till the end?"
is displayed.

In response to the display, icons 212, 216 and 218 to select whether the comparing process is continued are displayed. "YES (Y)" representative of an affirmation input on the icon 212, "NO (N)" representative of a negation input on the icon 216, and "Cancel" representative of an cancelling input of the process on the icon 218 are displayed.

In the dialog box D9, as a selection result in case a negation input "NO" of the icon 216 is selected, for example,
"If you select No, the file is regarded as having the same contents."
is displayed. The process means, by regarding as the same file by the comparing result of the predetermined size, that the comparing process of the file is cancelled.

Like this, if assumed that file size is huge, a following process also can be made. If a file of the same name as a file in the copy source exists in the copy destination folder (YES at step S341), the comparing process of a file is executed. It is determined whether file contents of the top part as a predetermined size, for example, 3 MB coincide between the file in the copy source and the file in the copy destination (step S3421). If the file contents thereof are different within the range from the top to 3 MB (NO at step S3421), the process of step S347 (FIG. 17) is executed.

If the file contents thereof coincide at the part of 3 MB (YES at step S3421), the dialog box D9 shown in FIG. 29 is displayed and input is waited (step S3422). In this case, in the dialog box D9 (FIG. 29), the determination whether "YES" is selected is executed (step S3423). If "NO" is selected (NO at step S3423), the process of step S343 (FIG. 17) is executed.

In the dialog box D9 (FIG. 29), if "YES" is selected (YES at step S3423), it is determined whether file contents after the preceding 3 MB part (the following part) coincide between the file in the copy source and the file in the copy destination (step S3424). If the file contents after 3 MB coincide (YES at step S3424), the process of step S343 (FIG. 17) is executed.

If the contents after 3 MB do not coincide (NO at step S3424), the process of step S347 (FIG. 17) is executed.

As described above, in case a file of the same name exists, since whether file contents thereof coincide is not compared along all of the size, the process can be moved to the next stage rapidly by a stop of the comparing process of a file of a huge size. In this case, it is without saying that determination of coinciding or not can be done as the comparing result if file size is less than 3 MB.

Eighth Embodiment

Figure 30:
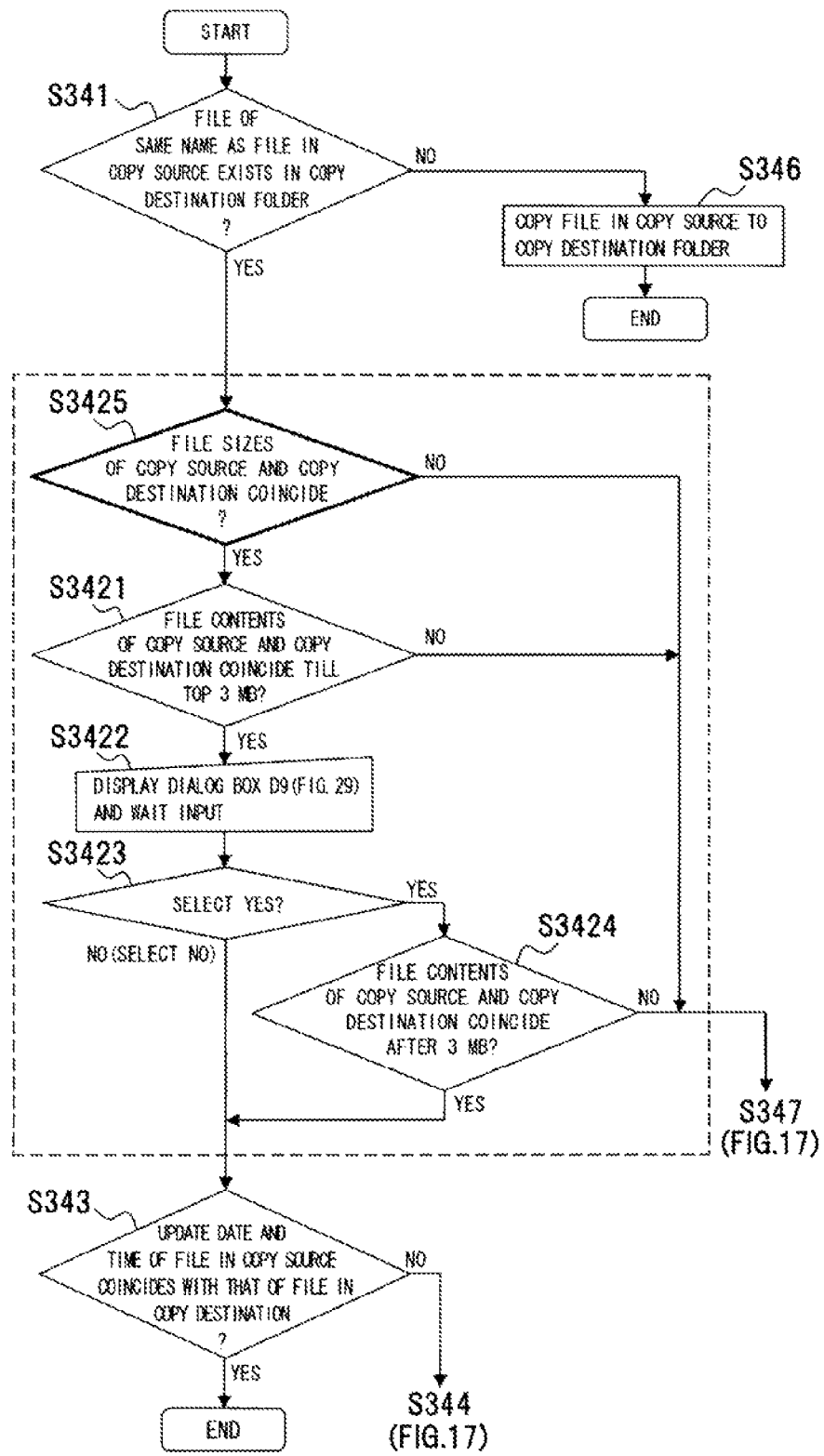
FIG. 30 is a flowchart showing another process of considering whether file size coincides according to an eighth embodiment.

An eighth embodiment of the present invention will be described with reference to FIG. 30. FIG. 30 is a flowchart showing another comparing process of considering whether file size coincides. In FIG. 30, the same components in FIG. 28 are denoted by the same reference numerals.

In the embodiment, in advance of comparison of file contents, a process is added that file size is compared and if the size is different, the contents are assumed not to coincide. In case the file size is different, a comparing process of the contents is unnecessary. Thus, speedier process can be realized.

As shown in FIG. 30, step S3425 is set at the front step of step S3421 of a flowchart shown in FIG. 29, and whether file sizes of the files in a copy source and copy destination coincide is determined (step S3425). After the determination, if the structure is made that the process returns to step S3421 or step S347 (FIG. 17), the above described speedy process can be done.

Like this, in case a file of the same name exists, coinciding or not of file size is powerful information on the file being identical or not. If the file size coincides, by comparison of file contents from the top to the predetermined range, determination accuracy whether the file contents coincide or not improves. Since whether the file contents coincide or not is not compared along all of the size, the process can be moved to the next stage rapidly.

Ninth Embodiment

Figure 31:
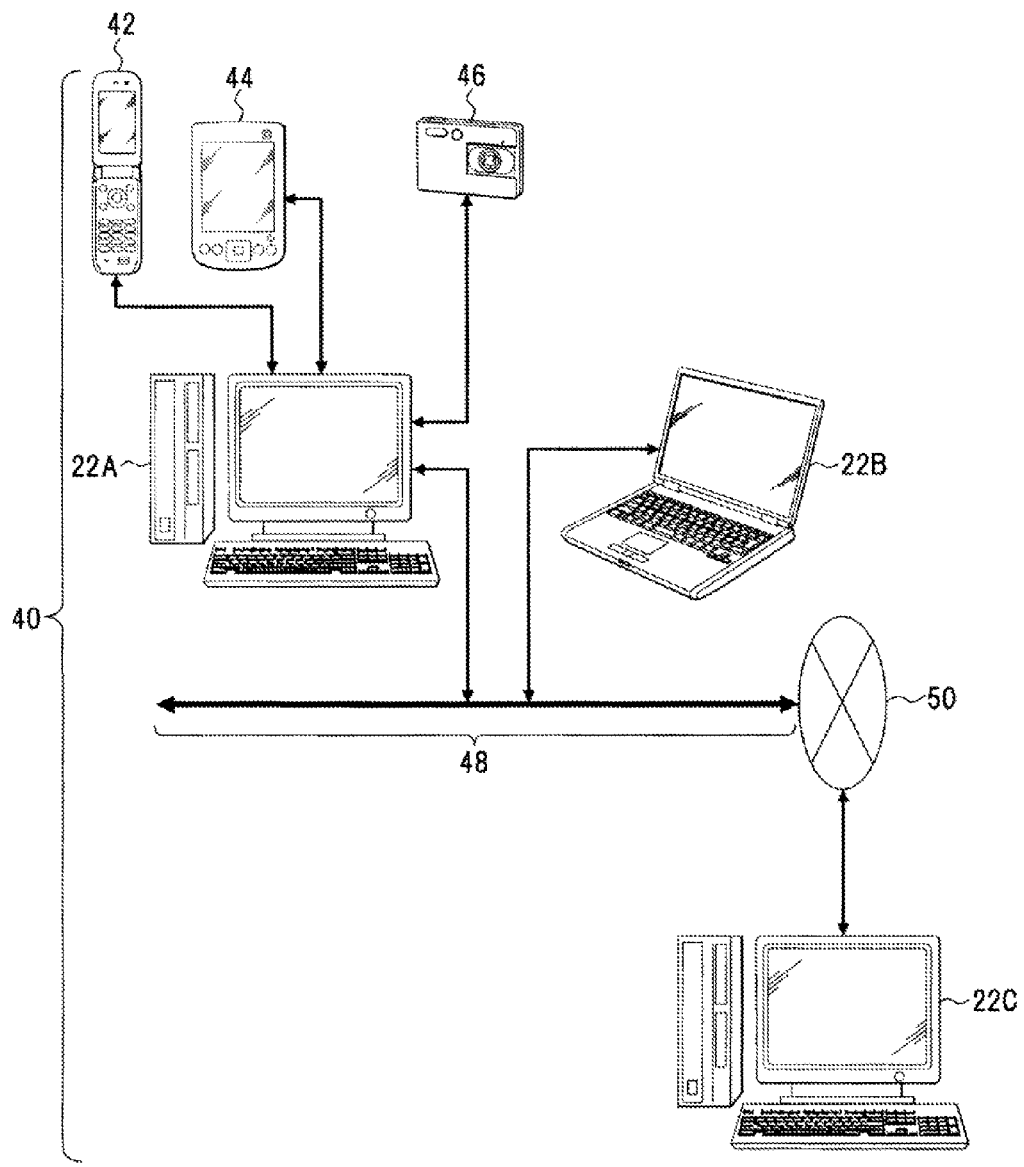
FIG. 31 depicts an information processing system according to a ninth embodiment.

A ninth embodiment of the present invention will be described with reference to FIG. 31. FIG. 31 depicts an information processing system using the above described information processing method, information processing program, information processing device and recording medium.

In the above embodiments, copying, moving or overwriting a file was explained with the example of the PC 22 (FIG. 3). The present invention can widely apply to file exchange, etc. between information processing devices. In the above embodiment (FIG. 18), a picture file of a digital camera is exemplified. The same process can be done with all of the files such as document file and other files able to be used by a computer. The process is not limited in a picture file taken by a digital camera, and can be used in general files.

For example, in this information processing system 40, a plurality of PCs 22A, 22B and 22C as information processing devices, and a cellular phone 42, a personal digital assistant (PDA) 44, a digital camera 46, etc. also as information processing devices are connected to the PC 22A via a universal serial bus (USB) cable, etc. The PC 22A and PC 22B are connected by a line 48 configured by wired or wireless connections, and connected to the PC 22C by a network 50 such as the internet or intranet. The PC 22C configures, for example, a server, and the PC 22A and PC 22B are clients.

In such structure, data between the PC 22A and the PC 22B, cellular phone 42, PDA 44 or digital camera 46 is sent and received. Data between the PC 22A and PC 22C is also sent and received via the network 50.

In such sending and receiving data, the above described copying, moving or overwriting a file can be executed, and efficient file processing and storing thereof can be done.

As being clarified from each embodiment described above, the present invention extracted from each embodiment is wide. The structure of the present invention relating to copying or moving a file and to achieve the objects of improving convenience of the file process, reduction of work and efficiency of the file process is described from an aspect of recording medium as follows.

That is, an aspect of the present invention relating to a recording medium used for file processing to achieve the above objects there is provided a recording medium that records an information processing program for causing a computer to execute copying or moving a file, comprising the step of: comparing file information and determining whether the file information coincides, wherein comparing elements of the file information include file contents.

Another aspect of the present invention to achieve the above objects there is provided a recording medium that records an information processing program for causing a computer to execute copying or moving a file, comprising the steps of: comparing file names of a copy source and copy destination, and determining whether a file of the same name exists in the copy destination or movement destination; in case a file of the same name exists in the copy destination, comparing file contents and determining whether the file contents are identical; and outputting a comparing result.

To achieve the above objects, in the recording medium, preferably the information processing program may comprise the steps of: in case the file contents are identical, comparing file date and time; in case the file date and time is different, inquiring whether the file date and time is modified; and in response to the inquiry, modifying the date and time.

To achieve the above objects, in the recording medium, preferably the information processing program may comprise the steps of: in case the file contents are different, inquiring whether the file of the copy source is overwritten on the file of the copy destination; and in response to a response to the inquiry, overwriting the file.

To achieve the above objects, in the recording medium, preferably the information processing program may comprise the steps of: in case the file contents are different, inquiring whether the file name is modified; and in response to a response to the inquiry, modifying the file name.

Another aspect of the present invention to achieve the above objects there is provided a recording medium that records an information processing program for causing a computer to execute copying or moving a file, comprising the steps of: comparing file names of a copy source and copy destination, and determining whether a file of the same name exists in the copy destination; in case a file of the same name exists in the copy destination, comparing file sizes and determining whether the file sizes are identical; and outputting a comparing result.

To achieve the above objects, in the recording medium, preferably the information processing program may comprise the step of: in case the compared file size is huge, inquiring whether the comparison of the file is continued.

In the above embodiments, in the comparison of the file contents, date and time thereof is used for comparing information. A process can be included that the date and time comprises only day, or comprises hour, minute and second.

While the present invention has been described with the preferred embodiments, the description is not intended to limit the present invention. Various modifications of the embodiments based on the subject matters and objects described in claims or disclosed in this specification will be apparent to those skilled in the techniques, and such modifications rightfully fall within the true scope of the present invention.

The present invention relates to copying or moving a file in an information processing device such as a personal computer (PC). About copying or moving a file, user's operation can be reduced and file processing can be facilitated to be efficient. Also, about copying or moving a file, the present invention can contribute to efficiency of file management and storage.

What is claimed is:

1. An information processing method comprising:
comparing, by a computer, a file name of a first file of copying or moving or both with a file name of a second file of a copy destination or a movement destination;
displaying, by a computer, a first operation part, a second operation part and a third operation part on a same dialog box when the file names of the first file and the second file are identical as a result of the comparing, the first operation part being for instructing that the second file be overwritten with the first file, the second operation part being for instructing that the file name of the first file be modified and the first file be copied or moved to the copy destination or the movement destination, the third operation part being for instructing that it be negatived to overwrite the second file with the first file; and
executing, by a computer, a process instructed by the first operation part, the second operation part or the third operation part in accordance with an instruction to select any one of the first operation part, the second operation part and the third operation part,
wherein the executing a process instructed by the second operation part includes attaching a numeral to an end of the file name of the first file to change the file name of the first file.

2. A non-transitory computer readable medium having stored therein a program for causing a computer to execute an information processing process comprising:
comparing a file name of a first file of copying or moving or both with a file name of a second file of a copy destination or a movement destination;
displaying a first operation part, a second operation part and a third operation part on a same dialog box when the file names of the first file and the second file are identical as a result of the comparing, the first operation part being for instructing that the second file be overwritten with the first file, the second operation part being for instructing that the file name of the first file be modified and the first file be copied or moved to the copy destination or the movement destination, the third operation part being for instructing that it be negatived to overwrite the second file with the first file; and
executing a process instructed by the first operation part, the second operation part or the third operation part in accordance with an instruction to select any one of the first operation part, the second operation part and the third operation part,
wherein the executing a process instructed by the second operation part includes attaching a numeral to an end of the file name of the first file to change the file name of the first file.

3. An information processing device comprising:
a display that displays a dialog box; and
a processing unit that compares a file name of a first file of copying or moving or both, with a file name of a second file of a copy destination or a movement destination, displays a first operation part, a second operation part and a third operation part on a same dialog box displayed on the display when the file names of the first file and the second file are identical as a result of the comparing, the first operation part being for instructing that the second file be overwritten with the first file, the second operation part being for instructing that the file name of the first file be modified and the first file be copied or moved to the copy destination or the movement destination, the third operation part being for instructing that it be negatived to overwrite the second file with the first file, and executes a process instructed by the first operation part, the second operation part or the third operation part in accordance with an instruction to select any one of the first operation part, the second operation part and the third operation part,
wherein the executing a process instructed by the second operation part includes attaching a numeral to an end of the file name of the first file to change the file name of the first file.

* * * * *